US010252684B2

(12) United States Patent
Miyado et al.

(10) Patent No.: US 10,252,684 B2
(45) Date of Patent: Apr. 9, 2019

(54) ATTACHMENT STRUCTURE FOR IN-VEHICLE CAMERA

(71) Applicant: TOYOTA JIDOSHA KABUSHIKI KAISHA, Toyota-shi, Aichi-ken (JP)

(72) Inventors: Takahiro Miyado, Toyota (JP); Yutaka Yamagiwa, Seto (JP); Masami Ishihara, Nissin (JP); Ryuichi Shinkai, Nishio (JP); Shinji Takeo, Seto (JP); Shintaro Kawamura, Toyota (JP); Ryo Iwamatsu, Toyota (JP); Kunihiko Toyofuku, Toyota (JP); Hajime Nagae, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 611 days.

(21) Appl. No.: 14/795,313

(22) Filed: Jul. 9, 2015

(65) Prior Publication Data
US 2016/0009230 A1    Jan. 14, 2016

(30) Foreign Application Priority Data
Jul. 10, 2014    (JP) ................................ 2014-142658

(51) Int. Cl.
*B60R 11/04*    (2006.01)
*B60R 11/00*    (2006.01)

(52) U.S. Cl.
CPC .............. *B60R 11/04* (2013.01); *B60R 11/00* (2013.01); *B60R 2011/0026* (2013.01); *B60R 2011/0078* (2013.01)

(58) Field of Classification Search
CPC . B60R 11/04; B60R 11/00; B60R 2011/0026; B60R 2011/0078;
(Continued)

(56) References Cited

U.S. PATENT DOCUMENTS

2007/0164188 A1* 7/2007 Mordau ................ B60S 1/0822
                                                           248/503
2009/0295181 A1* 12/2009 Lawlor ..................... B60R 1/12
                                                           296/1.11
(Continued)

FOREIGN PATENT DOCUMENTS

CN          102171068 A     8/2011
DE    10 2008 050 320 A1    4/2010
(Continued)

*Primary Examiner* — Justin M Larson
*Assistant Examiner* — Matthew T Theis
(74) *Attorney, Agent, or Firm* — Oliff PLC

(57) ABSTRACT

An attachment structure for an in-vehicle camera includes a first bracket and a second bracket. The first bracket is fixed to an inner surface of a windshield. The second bracket holds an in-vehicle camera when the second bracket is attached to the first bracket at an attachment position. The first bracket includes a support portion and a first one-way engagement portion. The second bracket includes a pressing portion and a second one-way engagement portion. The pressing portion presses a pressed portion of the in-vehicle camera against the support portion and holds the pressed portion between the pressing portion and the support portion when the second bracket is at the attachment position. The second one-way engagement portion cooperates with the pressing portion to inhibit the second bracket from moving with respect to the first bracket when the second one-way engagement portion is engaged with the first one-way engagement portion.

19 Claims, 15 Drawing Sheets

(58) Field of Classification Search
CPC ..... B60R 2011/0071; B60R 2011/0059; B60R 2011/005; B60R 2001/1253; G03B 17/566; G03B 17/561; F16M 11/041; B60S 1/0888; B60S 1/0881; G01D 11/30; G01D 11/245
USPC .......................................................... 224/482
See application file for complete search history.

(56) References Cited

U.S. PATENT DOCUMENTS

| | | | |
|---|---|---|---|
| 2010/0065707 A1* | 3/2010 | Hansel | B60R 11/04 248/298.1 |
| 2011/0233248 A1 | 9/2011 | Flemming et al. | |
| 2012/0099849 A1 | 4/2012 | Onishi et al. | |

FOREIGN PATENT DOCUMENTS

| | | | |
|---|---|---|---|
| JP | 2012-504518 A | | 2/2012 |
| JP | 2012-091596 A | | 5/2012 |
| JP | 2013-186278 A | | 9/2013 |
| JP | 2013-193558 A | | 9/2013 |
| JP | 2013186278 A | * | 9/2013 |
| WO | 2010/037500 A2 | | 4/2010 |

* cited by examiner

# ATTACHMENT STRUCTURE FOR IN-VEHICLE CAMERA

INCORPORATION BY REFERENCE

The disclosure of Japanese Patent Application No. 2014-142658 filed on Jul. 10, 2014 including the specification, drawings and abstract is incorporated herein by reference in its entirety.

BACKGROUND OF THE INVENTION

1. Field of the Invention

The invention relates to an attachment structure for an in-vehicle camera.

2. Description of Related Art

There is a case where a vehicle such as an automobile includes an in-vehicle camera that is configured to be installed in a vehicle cabin and capture a road ahead of the vehicle for a purpose of obtaining and recording information on the road ahead of the vehicle or assisting a driver in driving the vehicle. A CCD camera can be raised as an example of the in-vehicle camera. The in-vehicle camera is attached, with a bracket, to a specified position with respect to the vehicle. The bracket is commonly fixed by adhesion to an inner surface of a windshield.

The bracket used for attachment of the in-vehicle camera has a spring mechanism. The in-vehicle camera is pressed by the spring mechanism, and a portion of the in-vehicle camera is engaged with a portion of the bracket other than the spring mechanism. In this way, the in-vehicle camera is attached to the bracket. For example, an in-vehicle-camera attachment structure that includes the bracket with a plate spring as the spring mechanism is disclosed in Japanese Patent Application Publication No. 2013-193558 (JP 2013-193558 A).

In the in-vehicle-camera attachment structure in the related art, a spring member of the spring mechanism is fixed to the bracket. For this reason, the bracket needs to be replaced when it is desired to change the spring mechanism due to deterioration of a spring force of the spring member or the like. In addition, since the bracket is fixed by adhesion to the inner surface of the windshield, it is impossible to replace the bracket only. Accordingly, in order to replace the bracket, the windshield, to which the bracket is fixed, needs to be replaced. Therefore, maintenance related to the attachment of the in-vehicle camera cannot easily and efficiently be performed at low cost.

By the way, there is a case where the in-vehicle camera needs to be replaced even when the spring force of the spring member is not changed by aging. For example, there is a case where the in-vehicle camera is replaced with an in-vehicle camera in which a portion pressed by the spring member has different size or a different shape. In such a case, a pressing force that acts on the in-vehicle camera after the replacement no longer has a specified value. Thus, also in the case where the in-vehicle camera is replaced, the maintenance related to the attachment of the in-vehicle camera cannot possibly be performed easily and efficiently at low cost.

SUMMARY OF THE INVENTION

The invention provides an attachment structure for an in-vehicle camera.

An aspect of the invention is an attachment structure for an in-vehicle camera. The attachment structure is configured to attach an in-vehicle camera to an inner surface of a windshield of a vehicle. The attachment structure includes a first bracket and a second bracket. The first bracket is fixed to the inner surface of the windshield. The second bracket is configured to hold an in-vehicle camera with respect to the first bracket when the second bracket is attached to the first bracket at an attachment position. The first bracket includes a support portion and a first one-way engagement portion. The second bracket includes a pressing portion and a second one-way engagement portion. The pressing portion has elasticity. The pressing portion is configured to press a pressed portion of the in-vehicle camera against the support portion and to hold the pressed portion between the pressing portion and the support portion when the second bracket is at the attachment position. The second one-way engagement portion is configured to cooperate with the pressing portion to inhibit the second bracket from moving with respect to the first bracket when the second one-way engagement portion is engaged with the first one-way engagement portion.

According to the aspect of the invention, when the second bracket is at the attachment position, the pressed portion of the in-vehicle camera is elastically pressed against the support portion with the pressing portion and held between the pressing portion and the support portion. Furthermore, since the second one-way engagement portion is engaged with the first one-way engagement portion, displacement of the second bracket with respect to the first bracket is inhibited. Thus, the in-vehicle camera can be positioned at a specified position with respect to the first bracket by attaching the second bracket to the first bracket at the specified position.

In addition, when the second bracket is at the attachment position, at least part of a reaction force of a pressing force that is applied by the second bracket to the first bracket via the pressed portion for holding the in-vehicle camera is transmitted from the second bracket to the first bracket. Thus, the first one-way engagement portion and the second one-way engagement portion can also serve as reaction force transmission portions that transmit the reaction force of the pressing force from the second bracket to the first bracket.

The pressing force for positioning and holding the in-vehicle camera at the specified position with respect to the first bracket is a force that is generated when the pressing portion elastically presses, that is, a force that is generated due to elastic deformation of a portion of the second bracket. Accordingly, there is no need to provide a spring mechanism in the first bracket. Thus, even when maintenance is required, for example, for handling reduction in the pressing force, or for replacement of the in-vehicle camera with an in-vehicle camera including the pressed portion having different size or a different shape, only the second bracket needs to be replaced, and neither the first bracket nor the windshield needs to be replaced. Therefore, the maintenance related to the pressing force and/or the replacement of the in-vehicle camera can easily and efficiently be performed at low cost.

In the aspect of the invention, the second bracket may be attached to the first bracket when the second bracket is displaced with respect to the first bracket in a first direction substantially along the windshield. The pressing portion may be configured to press the pressed portion in a second direction crossing the first direction and the windshield when the second bracket is at the attachment position.

According to the above configuration, the second bracket moves against the reaction force of the pressing force in the first direction with respect to the first bracket. In this way, the second bracket is attached to the first bracket at the attachment position. Therefore, the second bracket can easily be attached to the first bracket, and application of unnecessary stress in the direction crossing the windshield (a second direction) during the attachment of the second bracket to the first bracket can be avoided.

In the above configuration, the support portion may include a portion positioned below the pressing portion when the second bracket is at the attachment position. The second direction may be a direction away from the windshield downward.

According to the above configuration, when the second bracket is attached to the first bracket at the attachment position, a worker moves the second bracket in the first direction with respect to the first bracket. In such a situation, a direction in which the pressing portion elastically presses the pressed portion of the in-vehicle camera against the support portion is a direction away from the windshield downward. Accordingly, the support portion does not receive a force that has an upward component to approach the windshield, and the windshield does not receive the upward force from the first bracket. Therefore, in the case where the in-vehicle camera is attached after the windshield, to which the first bracket is fixed in advance, is fixed by adhesion to a vehicle body, even when the worker moves the second bracket by a relatively large force, it is possible to prevent the windshield from being removed from the vehicle body.

In the above configuration, the first bracket may include a first contact portion that extends parallel to the first direction. The second bracket may include a second contact portion in contact with the first contact portion when the second bracket is at the attachment position. At least part of a reaction force generated when the pressing portion presses the pressed portion in the first direction may be transmitted from the second one-way engagement portion to the first one-way engagement portion. At least part of a reaction force generated when the pressing portion presses the pressed portion in the second direction may be transmitted from the second contact portion to the first contact portion.

According to the above configuration, while the displacement of the second bracket in a direction reverse to the first direction is inhibited, at least part of the reaction force that is generated when the pressing portion presses the pressed portion in the first direction can be transmitted from the second one-way engagement portion to the first one-way engagement portion. In addition, since the second bracket can come in contact with the first contact portion that extends parallel to the first direction, the first contact portion and the second contact portion can relatively be displaced in the first direction in a state that the first contact portion and the second contact portion are in contact with each other. Therefore, while the displacement of the second bracket in the first direction to the attachment position with respect to the first bracket is permitted, at least part of the reaction force that is generated when the pressing portion presses the pressed portion in the second direction can be transmitted from the second contact portion to the first contact portion.

In the above configuration, the attachment structure may include the in-vehicle camera. The pressed portion may include a first pressed portion and a second pressed portion. The first pressed portion and the second pressed portion may be spaced from each other at least in the first direction when the in-vehicle camera is attached in the attachment structure. The support portion may include a first support portion and a second support portion. The pressing portion may include a first pressing portion and a second pressing portion. The first pressing portion may be configured to press the first pressed portion against the first support portion when the in-vehicle camera is attached in the attachment structure. The second pressing portion may be configured to press the second pressed portion against the second support portion when the in-vehicle camera is attached in the attachment structure.

According to the above configuration, at two positions being spaced from each other at least in the first direction, the first pressing portion and the second pressing portion can elastically and respectively press the first pressed portion and the second pressed portion of the in-vehicle camera against the first support portion and the second support portion. Therefore, compared to a case where one pressing portion, one support portion, and one pressed portion are provided, the in-vehicle camera can accurately be positioned with respect to the first bracket and can stably be held at the specified position.

In the above configuration, the first pressed portion may include a pair of first pressed portions configured to extend along the windshield and to be spaced from each other in a direction perpendicular to the first direction when the second bracket is at the attachment position and the in-vehicle camera is attached in the attachment structure. The second pressed portion may include a pair of second pressed portions configured to extend along the windshield and to be spaced from each other in the direction perpendicular to the first direction when the second bracket is at the attachment position and the in-vehicle camera is attached in the attachment structure. The first support portion may include a pair of first support portions configured to extend along the windshield and to be spaced from each other in the direction perpendicular to the first direction when the second bracket is at the attachment position and the in-vehicle camera is attached in the attachment structure. The second support portion may include a pair of second support portions configured to extend along the windshield and to be spaced from each other in the direction perpendicular to the first direction when the second bracket is at the attachment position and the in-vehicle camera is attached in the attachment structure. The first pressing portion may include a pair of first pressing portions configured to extend along the windshield and to be spaced from each other in the direction perpendicular to the first direction when the second bracket is at the attachment position and the in-vehicle camera is attached in the attachment structure. The second pressing portion may include a pair of second pressing portions configured to extend along the windshield and to be spaced from each other in the direction perpendicular to the first direction when the second bracket is at the attachment position and the in-vehicle camera is attached in the attachment structure.

According to the above configuration, the first pressed portions are configured to extend along the windshield and to be spaced from each other in a direction perpendicular to the first direction when the second bracket is at the attachment position and the in-vehicle camera is attached in the attachment structure. In addition, each of the pair of the second pressed portions, the pair of the first support portions, the pair of the second support portion, the pair of the first pressing portions, and the pair of the second pressing portions is provided in the same manner as the pair of the first pressed portions. Therefore, compared to a case where the first pressed portion, the second pressed portion, and the like are not provided in pair, the in-vehicle camera can accurately be positioned with respect to the first bracket, and the in-vehicle camera can stably be held at the specified position.

In the above configuration, the second bracket may be configured to be displaced in a third direction from the second support portion toward the first support when the second bracket is attached to the first bracket. The first pressing portion may be positioned on an advanced side with respect to the second pressing portion in the third direction. The first pressing portion may be configured to press, when the second bracket is attached to the first bracket, the first pressed portion against the first support portion before the second pressing portion presses the second pressed portion against the second support portion. The second pressing portion may be configured to make a surface contact with the second pressed portion when the second bracket reaches the attachment position.

According to the above configuration, first pressing of the first pressed portion against the first support portion is initiated by the first pressing portion, and then the pressing of the second pressed portion against the second support portion is initiated by the second pressing portion. Accordingly, the first pressed portion can be restrained by the first support portion when the first pressing portion presses the first pressed portion, and the second pressing portion can press the second pressed portion against the second support portion in such a state. Therefore, compared to a configuration in which the first pressing portion and the second pressing portion simultaneously initiate pressing of the first pressed portion and the second pressed portion against the first support portion and second support portion, a degree of an abrupt increase in a force that is required to move the second bracket in the first direction with respect to the first bracket can be reduced. In addition, the second pressing portion makes a favorable surface contact with the second pressed portion. Therefore, compared to a case where the second pressing portion makes a point contact or a line contact with the second pressed portion, the in-vehicle camera can accurately be positioned with respect to the first bracket, and the in-vehicle camera can stably be held at the specified position.

In the above configuration, the first support portion may include a portion positioned below the first pressing portion when the second bracket is at the attachment position. The second support portion may include a portion positioned below the second pressing portion when the second bracket is at the attachment position. The second direction may be a direction away from the windshield downward.

According to the above configuration, when the second bracket is attached to the first bracket at the attachment position, the worker moves the second bracket in the first direction with respect to the first bracket. In such a situation, a direction in which the first pressing portion and the second pressing portion elastically and respectively press the first pressed portion and the second pressed portion of the in-vehicle camera against the first support portion and the second support portion is the direction away from the windshield downward. Accordingly, the first support portion and the second support portion do not receive the upward force that approaches the windshield, and the windshield does not receive the force that has the upward component from the first bracket. Therefore, in a situation where the in-vehicle camera is attached after the windshield, to which the first bracket is fixed in advance, is fixed by adhesion to the vehicle body, even when the worker moves the second bracket by the relatively large force, it is possible to prevent the windshield from being removed from the vehicle body.

In the above configuration, the first one-way engagement portion may be positioned between the first support portion and the second support portion in the first direction.

According to the above configuration, components in the direction crossing the windshield of the pressing forces that are generated when the first pressing portion and the second pressing portion elastically and respectively press the first pressed portion and the second pressed portion against the first support portion and the second support portion acts in the same direction on both sides of the first support portion in the first direction. Therefore, compared to the case where the first one-way engagement portion is not positioned between the first support portion and the second support portion in the first direction, it is possible to reduce moment that acts around the first one-way engagement portion due to components in the direction crossing the windshield of the pressing forces of the first pressing portion and the second pressing portion.

In the above configuration, the first bracket may include a pair of first contact portions, the first contact portions extending parallel to the first direction and being spaced from each other in the first direction. The second bracket may include a pair of second contact portions. Each of the second contact portions may be configured to come in contact with a corresponding one of the first contact portions when the second bracket is at the attachment position. At least part of a reaction force generated when the first pressing portion presses the first pressed portion in the first direction may be transmitted from the second one-way engagement portion to the first one-way engagement portion. At least part of a reaction force generated when the second pressing portion presses the second pressed portion in the first direction may be transmitted from the second one-way engagement portion to the first one-way engagement portion. At least part of a reaction force generated when the first pressing portion presses the first pressed portion in the second direction may be transmitted from the second contact portions to the first contact portions and the first one-way engagement portion. At least part of a reaction force generated when the second pressing portion presses the second pressed portion in the second direction may be transmitted from the second contact portions to the first contact portions and the first one-way engagement portion.

According to the above configuration, while the displacement of the second bracket in the direction reverse to the first direction is inhibited, the reaction forces that are generated when the first pressing portion and the second pressing portion respectively press the first pressed portion and the second pressed portion in the first direction can mainly be transmitted from the second one-way engagement portion to the first one-way engagement portion. In addition, in a state that the first contact portions respectively come in contact with the second contact portions, the first contact portions can relatively be displaced to the second contact portions in the first direction. Therefore, while the displacement of the second bracket in the first direction to the attachment position with respect to the first bracket is permitted, at least part of the reaction forces that are generated when the first pressing portion and the second pressing portion press the pressed portions in the second direction can be transmitted from the pair of the second contact portions to the pair of the first contact portions.

In the above configuration, the first bracket may include a first guide portion. The second bracket may include a second guide portion. The first guide portion and the second guide portion may be configured to cooperate with each other to guide the second bracket to move in the first direction.

According to the above configuration, the displacement of the second bracket can be guided by the first guide portion and the second guide portion that cooperate with each other such that the second bracket is displaced in the first direction. Therefore, compared to a case where the first guide portion and the second guide portion are not provided, the second bracket can smoothly move to the attachment position in the first direction with respect to the first bracket.

In the above configuration, the second bracket may include a camera engagement portion. The camera engagement portion may be engaged, when the second bracket is at the attachment position and the in-vehicle camera is attached in the attachment structure, with the in-vehicle camera to inhibit the in-vehicle camera from moving along the windshield perpendicularly to the first direction with respect to the first bracket and the second bracket.

According to the above configuration, also in the direction perpendicular to the first direction along the windshield, the in-vehicle camera can be positioned at the specified position with respect to the first bracket by the second bracket. In addition, the relative movement of the in-vehicle camera with respect to the first bracket and the second bracket in the direction perpendicular to the first direction along the windshield is inhibited. In this way, also in the direction perpendicular to the first direction, the in-vehicle camera can stably be held at the specified position.

In the above configuration, the first bracket may include a pair of first lateral walls. The first lateral walls may extend along the windshield in the first direction, and are spaced from each other perpendicularly to the first direction. The second bracket may include a pair of second lateral walls. The second lateral walls may extend along the windshield in the first direction and are spaced from each other perpendicularly to the first direction when the second bracket is at the attachment position. One of the pair of the first lateral walls and the pair of the second lateral walls may be configured to directly hold at least a part of the in-vehicle camera. At least a part of the first lateral wall may be engaged, when the second bracket is at the attachment position, with the second lateral wall to inhibit the second bracket from moving with respect to the first bracket in a direction crossing the first lateral walls and the second lateral walls.

According to the above configuration, it is possible to inhibit movement of the in-vehicle camera with respect to the first bracket and the second bracket in the direction crossing the wall surface of each lateral wall.

In the above configuration, an inclination angle of the first direction with respect to the windshield may be 20 degrees or less. In addition, the inclination angle of the first direction with respect to the windshield may be 15 degrees or less. Furthermore, the inclination angle of the first direction with respect to the windshield may be 10 degrees or less.

In the above configuration, an inclination angle of the second direction with respect to the windshield may be 70 degrees or more. In addition, the inclination angle of the second direction with respect to the windshield may be 75 degrees or more. Furthermore, the inclination angle of the second direction with respect to the windshield may be 80 degrees or more.

In the above configuration, the second direction may be perpendicular to the first direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will hereinafter be made on a preferred embodiment of the invention with reference to the accompanying drawings.

Figure 1:
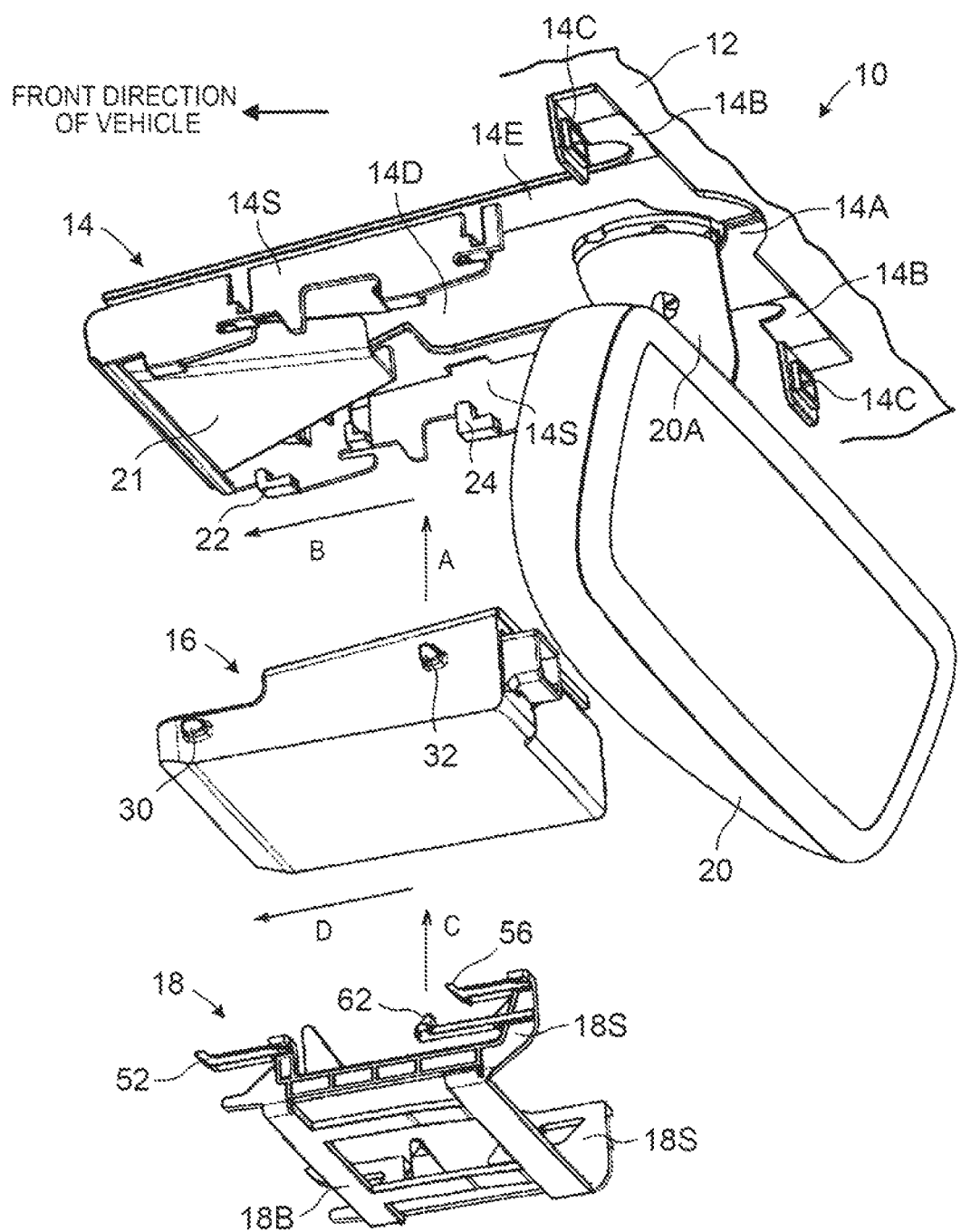
FIG. 1 is an exploded perspective view of an embodiment of an attachment structure for an in-vehicle camera according to an embodiment of the invention when seen obliquely from rear and below.
Figure 2:
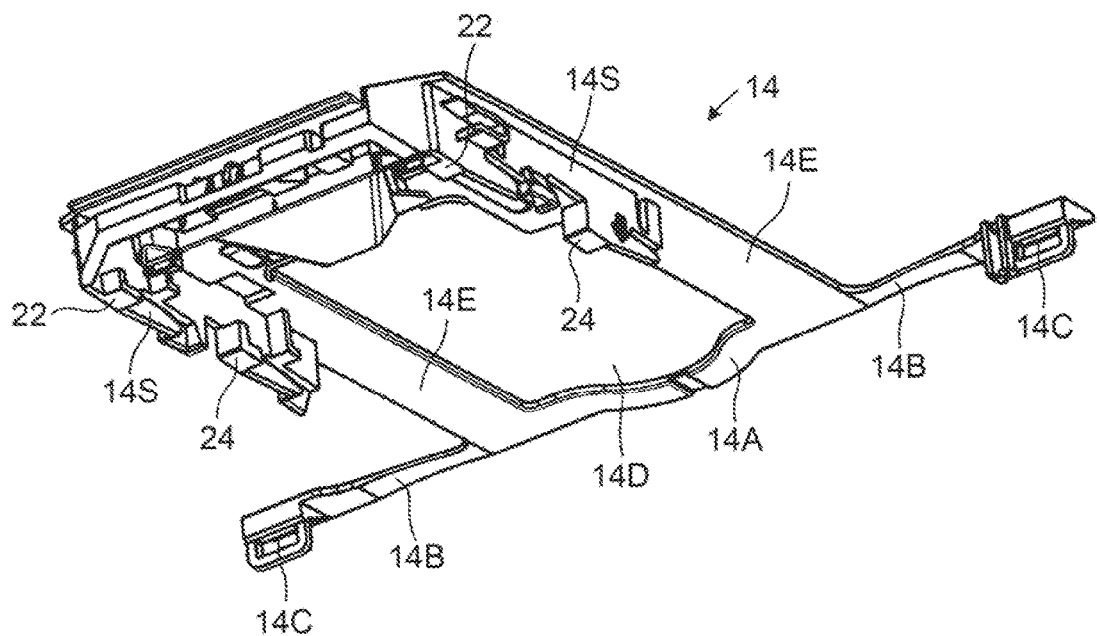
FIG. 2 is a perspective view of a first bracket shown in FIG. 1 when seen obliquely from front and below.
Figure 3:
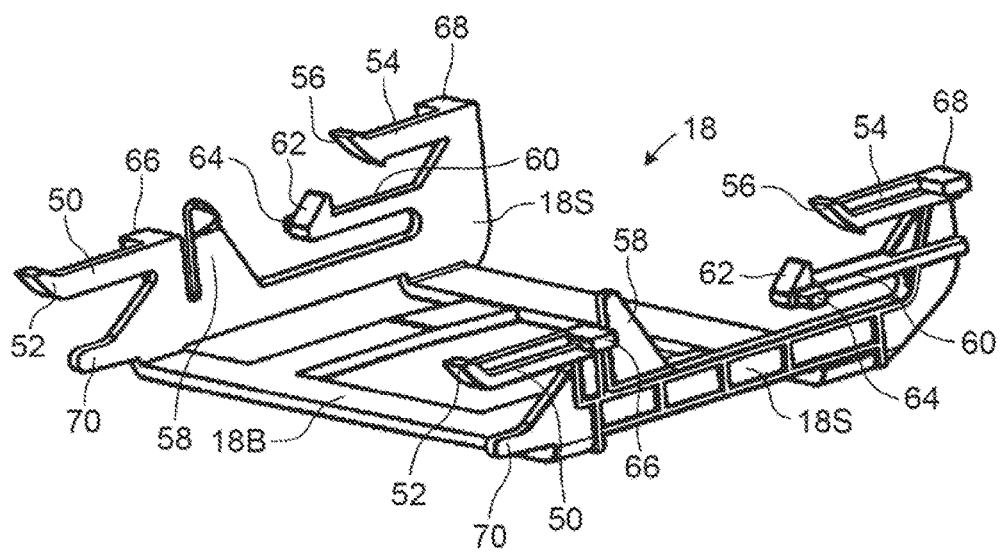
FIG. 3 is a perspective view of a second bracket shown in FIG. 1 when seen obliquely from the front and above.

FIG. 1 is an exploded perspective view of an attachment structure 10 for an in-vehicle camera according to the embodiment of the invention when seen obliquely from rear and below. The attachment structure 10 may be referred to as an in-vehicle-camera attachment structure 10 hereinafter. In addition, FIG. 2 is a perspective view of a first bracket when seen obliquely from front and below, and FIG. 3 is a perspective view of a second bracket when seen obliquely from the front and above.

It should be noted that directions such as the front and positional relationships such as a front end and a right side in the following description are directions and positional relationships in a case where a situation where the in-vehicle camera is attached by the attachment structure 10 is seen during forward traveling of a vehicle. In addition, in order to avoid complexity, cross sections are not hatched in the accompanying drawings of the subject application.

As shown in FIG. 1, the attachment structure 10 has a first bracket 14 as a main bracket and a second bracket 18 as a sub-bracket that holds an in-vehicle camera 16 with respect to the first bracket. In the first bracket 14, a plate-shaped base 14A is fixed by adhesion to an inner surface of a windshield 12. The first bracket 14 is preferably formed of fiber reinforced plastic with high strength and rigidity, such as glass fiber reinforced polybutylene terephthalate (PBT) in which the volume fraction of fiber is approximately several tens of percent. However, the first bracket 14 may be formed of other materials such as metal.

As will be described in detail below, the second bracket 18 is configured to substantially move in a first direction along the windshield 12 to an attachment position with respect to the first bracket 14, so as to be attached to the first bracket. The second bracket 18 may be formed of any material such as plastic and metal. However, the second bracket 18 is preferably formed of polyoxymethylene (POM) resin plastic with high strength, elasticity, abrasion resistance, and the like so that, in particular, a specified portion thereof can elastically be deformed.

Although not shown, the windshield 12 is attached to a vehicle body in a front inclined state that a height thereof is lowered toward the front of the vehicle. The base 14A of the first bracket 14 generally has a mouth shape (punched rectangular shape) when seen in a direction perpendicular to the windshield 12. The base 14A extends such that a longitudinal direction thereof conforms to a front-rear direction of the vehicle. Accordingly, as will be described in detail below, the first direction in which the second bracket 18 moves with respect to the first bracket 14 is a direction that conforms to a front direction of the vehicle and substantially follows the windshield 12.

Noted that, in the illustrated embodiment, a pair of arms 14B that extending in a horizontal direction of the vehicle is provided at a rear end of the base 14A, and an attachment 14C for attaching a cover 80 (see FIG. 18) is provided at a tip of each arm 14B. In a region of a punched portion 14D of the base 14A that is on a rear side of the vehicle and at a center in a vehicle width direction, a bracket 20A of a rear-view mirror 20 is fixed by adhesion to an inner surface of the windshield 12. Furthermore, in FIG. 1, a light shielding hood 21 for shielding light that enters through the windshield 12 is attached to a portion of the base 14A that is on a front side of the vehicle.

As shown in FIG. 1, when the in-vehicle camera 16 is attached to the windshield 12 by the attachment structure 10, the in-vehicle camera 16 is first positioned to contact a lower surface of the first bracket 14 as indicated by an arrow A. Next, as indicated by an arrow B, the in-vehicle camera 16 moves in the first direction with respect to the first bracket 14. Then, as indicated by an arrow C, the second bracket 18 is positioned with respect to the first bracket 14 and the in-vehicle camera 16 from below. Furthermore, as indicated by an arrow D, the second bracket 18 moves in the first direction with respect to the first bracket 14 and the in-vehicle camera 16. Thus, the first direction corresponds to a direction of each of the arrows B and D.

Figure 4:
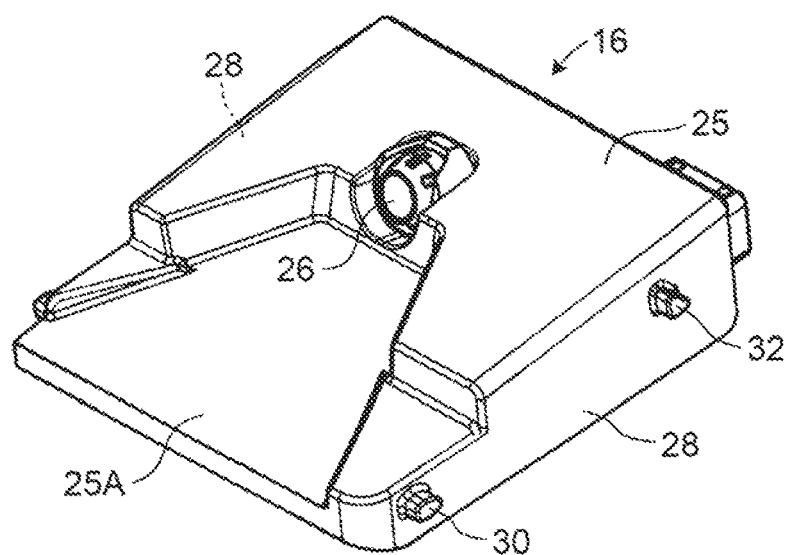
FIG. 4 is a perspective view of the in-vehicle camera.
Figure 5:
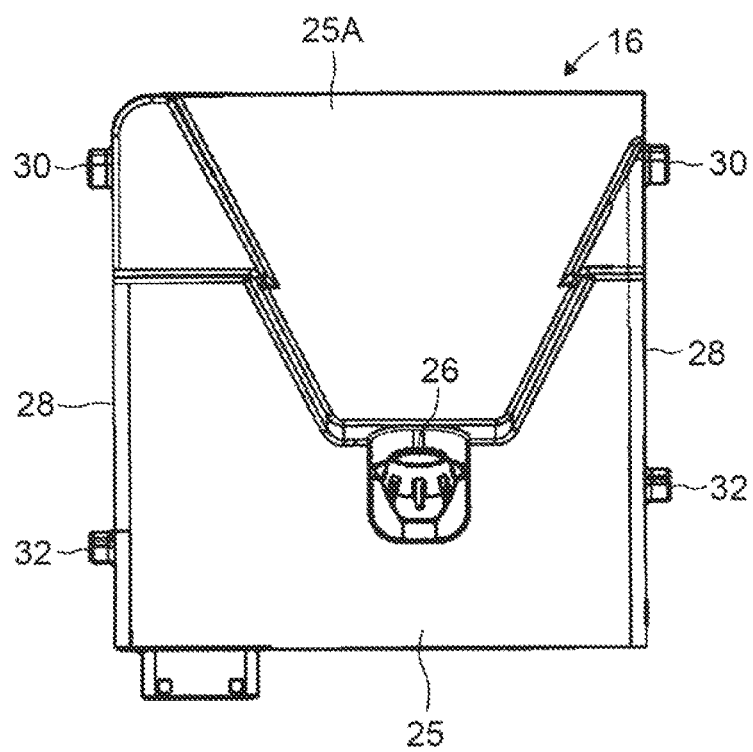
FIG. 5 is a plan view of the in-vehicle camera.

FIG. 4 and FIG. 5 are respectively a perspective view and a plan view of the in-vehicle camera 16. In particular, when a situation where the in-vehicle camera 16 is attached by the attachment structure 10 is assumed, FIG. 4 is a perspective view of the in-vehicle camera 16 when seen obliquely from the front and above, and FIG. 5 is a plan view of the in-vehicle camera 16 when seen directly from above.

As shown in FIG. 4 and FIG. 5, the in-vehicle camera 16 has a cuboid shape as a whole. When the in-vehicle camera 16 is attached by the attachment structure 10, a portion thereof that is positioned on the rear side of the vehicle is thicker than a portion thereof that is positioned on the front side of the vehicle. The in-vehicle camera 16 has a lens 26 that is supported by a housing 25. Although not shown in FIG. 4 or FIG. 5, an imaging element, an electronic circuit, and the like are accommodated in the housing 25. Noted that the housing 25 may be formed of plastic or metal.

A first pressed portion 30 and a second pressed portion 32 are provided on each of right and left lateral surfaces 28 of the housing 25, and each of these pressed portions has a shape of a projection that is projected perpendicularly from the lateral surface. The right and left first pressed portions 30 are provided in the vicinity of a front end of the in-vehicle camera 16, and the right and left second pressed portion 32 are placed on a rear side of the vehicle to be spaced from the corresponding first pressed portions 30. The housing 25 is provided with a depression 25A in front of the lens 26, and the depression 25A transmits light that enters the lens. Furthermore, a pair of hooks (not shown) for positioning and fixing the front end of the in-vehicle camera 16 to the first bracket 14 is provided at a front end of the housing 25 in a state of being spaced from each other in the horizontal direction of the vehicle.

As shown in FIG. 2, lateral walls 14S are integrally provided in right and left lateral sides 14E of the first bracket 14. Each of the lateral walls 14S extends along a lateral side that corresponds to the lateral side 14E perpendicularly. A first support portion 22 and a second support portion 24 for the in-vehicle camera 16 are integrally formed on each of lateral surfaces (inner lateral surfaces) of the lateral walls 14S that face each other.

As will be described in detail below, each of the first support portions 22 supports the corresponding one of the first pressed portions 30 of the in-vehicle camera 16, and each of the second support portions 24 supports the corresponding one of the second pressed portions 32. Accordingly, the right and left second support portions 24 are placed on the rear side of the vehicle to be spaced from the corresponding first support portions 22. Each of the support portions has an L shape when seen in the horizontal direction of the vehicle.

Figure 6:
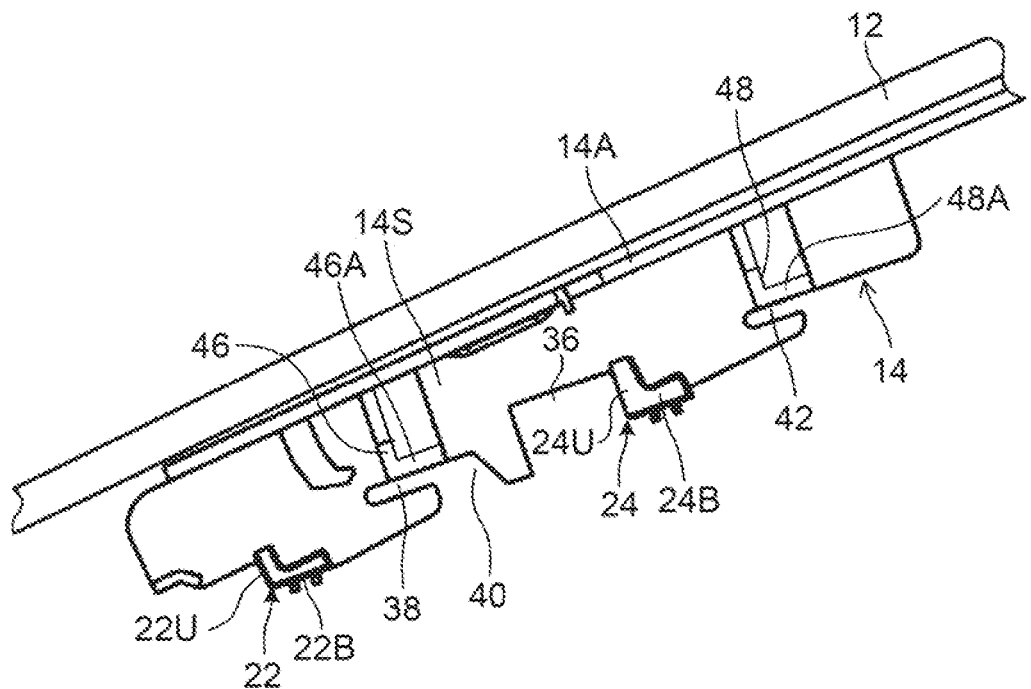
FIG. 6 is an enlarged partial view of a right lateral wall of the first bracket when seen from a left lateral wall side.

FIG. 6 is an enlarged partial view of the right lateral wall 14S of the first bracket 14 when seen from the left lateral wall side. As it is understood from this FIG. 6, the first support portion 22 and the second support portion 24 respectively have bottom walls 22B and 24B that substantially extend along the base 14A and upright portions 22U and 24U that are integrated with the bottom walls and extend upward from front ends of the bottom walls. The first support portion 22 and the second support portion 24 on the left side are respectively formed in a similar manner as the first support portion 22 and the second support portion 24 on the right side.

In each of the right and left lateral walls 14S, a notch 36 is provided on the front side of the second support portion 24. In addition, in each of the right and left lateral walls 14S, a first guide groove 38 is provided in a region between the first support portion 22 and the notch 36. A guide receiving depression 40 is provided on a rear end side of each guide groove 38. The guide receiving depression 40 is formed since the lateral wall 14S is molded to project toward an outer side in the horizontal direction of the vehicle.

Furthermore, in each of the right and left lateral walls 14S, a second guide groove 42 is provided at a rear of the second support portion 24. A depression that corresponds to the guide receiving depression 40 is not provided on a rear end side of each guide groove 42, and the rear end of each guide groove 42 is opened rearward. Upper surfaces of the first guide groove 38 and the second guide groove 42 and lower surfaces of main portions of these guide grooves extend parallel to the first direction.

Moreover, in each of the right and left lateral walls 14S, a first rib 46 and a second rib 48, each of which has an L shape when seen in the horizontal direction of the vehicle, are respectively provided above the first guide groove 38 and the second guide groove 42. The lower ends of the first rib 46 and the second rib 48 respectively define same planes as the upper surfaces of the first guide groove 38 and the second guide groove 42 and, as will be described below, respectively serve as first contact portions 46A and 48A.

As shown in FIG. 3, the second bracket 18 has a pair of lateral walls 18S and a bottom wall 18B. The lateral walls 18S extend parallel to each other in the front-rear direction. The bottom wall 18B integrally connects lower edges of the lateral walls 18S and extends in the horizontal direction. A first elastic arm 50 that extends toward the front and can elastically be deformed in a vertical direction is provided at a front end of each lateral wall 18S. Each elastic arm 50 has a first pressing portion 52 at a tip thereof. An end surface of each pressing portion 52 is slightly curved in a projected shape and inclined so as to be erected toward a tip, and is smoothly connected to a lower edge of the elastic arm 50.

A second elastic arm 54 that extends to the front and can elastically be deformed in the vertical direction is provided at a rear end of each lateral wall 18S. Each elastic arm 54 has a second pressing portion 56 at a tip thereof. An end surface of each pressing portion 56 is slightly curved in a projected shape and inclined so as to be erected toward a tip, and extends below a lower edge of the elastic arm 54. In an intermediate portion of each lateral wall 18S, a camera engagement projection 58 is provided at a position close to the first elastic arm 50. A tip of each camera engagement projection 58 is thicker than remaining portions, and an inner surface of the tip is inclined such that a front side is thinner than a rear side. Each of the elastic arms 50 and 54 may be regarded as a second contact portion.

Figure 7:
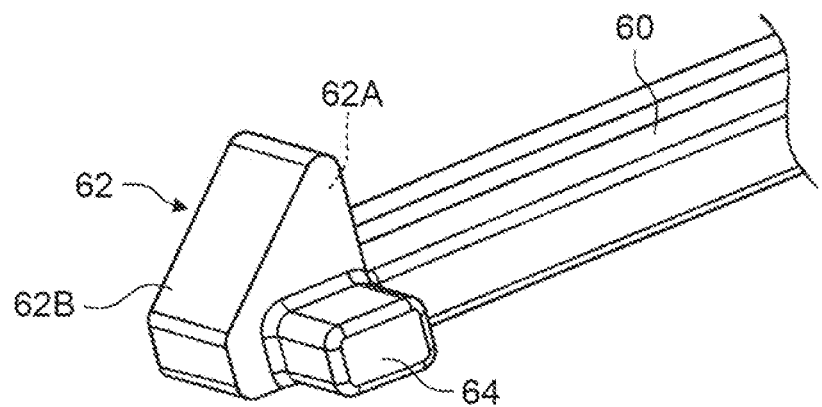
FIG. 7 is an enlarged partial perspective view of a third elastic arm and a one-way claw.

A third elastic arm 60 that extends to the front and can elastically be deformed in the vertical direction is provided at a position below and in front of each second elastic arm 54 and at the rear end of the lateral wall 18S. Each elastic arm 60 has a one-way claw 62 at a tip thereof, and each one-way claw 62 is projected upward from the elastic arm 60. As shown in FIG. 7, each one-way claw 62 has a one-way engagement surface 62A that extends perpendicularly to an extending direction of the elastic arm 60 and an inclined surface 62B that is inclined to be lowered toward a tip of the elastic arm 60. A projection 64 for removal that is projected in the horizontal direction is provided on an outer lateral surface of each one-way claw 62. As will be described below, the projection 64 is used when the second bracket 18 is removed from the first bracket 14.

A first guide projection 66 that is projected in the horizontal direction is provided on an outer lateral surface at a root of each first elastic arm 50. A second guide projection 68 that is projected in the horizontal direction is provided on an outer lateral surface at a root of each second elastic arm 54. Upper surfaces of the first guide projection 66 and the second guide projection 68 respectively define same planes as upper surfaces of the first elastic arm 50 and the second elastic arm 54. As will be described below, the first guide projection 66 and the second guide projection 68 are respectively engaged with the first guide groove 38 and the second guide groove 42 when the second bracket 18 moves with respect to the first bracket 14. In this way, the first guide projection 66 and the second guide projection 68 guide the second bracket 18 in the first direction. Each of the first guide groove 38 and the second guide groove 42 may be regarded as a first guide portion of the invention. Each of the first guide projection 66 and the second guide projection 68 may be regarded as a second guide portion of the invention.

The attachment of the in-vehicle camera 16 to the windshield 12 by the attachment structure 10 is performed by a following procedure.

Figure 8:
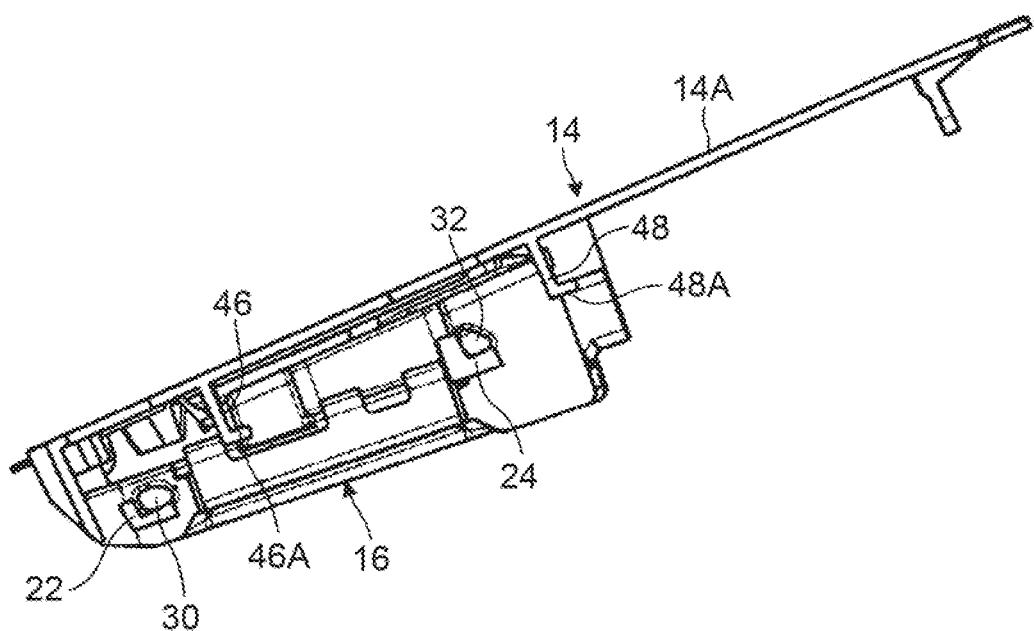
FIG. 8 is a side view of a situation where the in-vehicle camera is arranged in the first bracket.

First, as shown in FIG. 1 and FIG. 8, the in-vehicle camera 16 substantially moves along the base 14A to the front with respect to the first bracket 14, and the in-vehicle camera 16 is temporarily positioned with respect to the first bracket 14. This temporary positioning is performed by placing the right and left first pressed portions 30 on the corresponding first support portions 22 and placing the right and left second pressed portions 32 on the corresponding second support portions 24. In this case, the first support portion 22 and the second support portion 24 are respectively positioned below the corresponding first pressed portion 30 and the corresponding second pressed portion 32. Thus, even when a manual force of a worker who supports the in-vehicle camera 16 is released, the in-vehicle camera 16 does not drop. A weight of the in-vehicle camera 16 is borne by the first support portion 22 and the second support portion 24.

Figure 9:
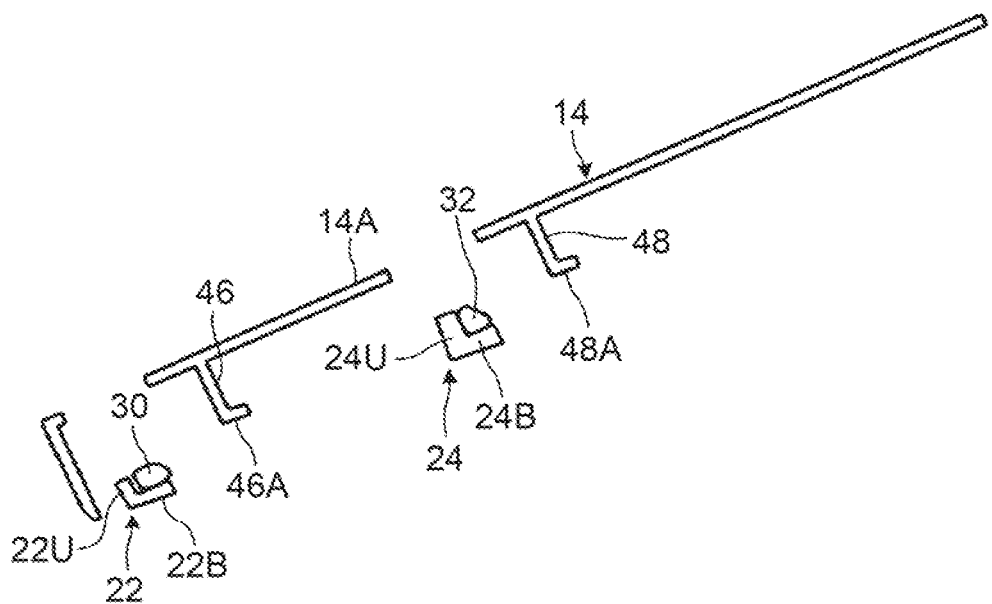
FIG. 9 is a side view of a situation where a first pressed portion is placed on a first support portion and a second pressed portion is placed on a second support portion.

As shown in FIG. 8 and FIG. 9, the shape of each of the first pressed portion 30 and the second pressed portion 32 when seen in the horizontal direction is a rectangle, an upper rear corner of which is chamfered and each corner of which is rounded. The second pressed portion 32 is higher than the first pressed portion 30, and a degree of chamfering is more substantial in the second pressed portion 32 than in the first pressed portion 30. In particular, in the illustrated embodiment, as shown in FIG. 12 to FIG. 16, while a chamfered tilted surface 30A of the first pressed portion 30 is curved in a projected shape when seen in the horizontal direction, a chamfered tilted angle surface 32A of the second pressed portion 32 is curved in a recessed shape when seen in the horizontal direction.

In addition, a distance between a front surface of the first pressed portion 30 and a front surface of the second pressed portion 32 is set shorter than a distance between a rear surface of the upright portion 22U of the first support portion 22 and a rear surface of the upright portion 24U of the second support portion 24. Accordingly, the second pressed portion 32 comes in contact with the bottom wall 24B and the upright portion 24U of the second support portion 24. Meanwhile, although the first pressed portion 30 comes in contact with the bottom wall 22B of the first support portion 22, the first pressed portion 30 does not come in contact with the upright portion 24U of the first support portion 22.

Figure 10:
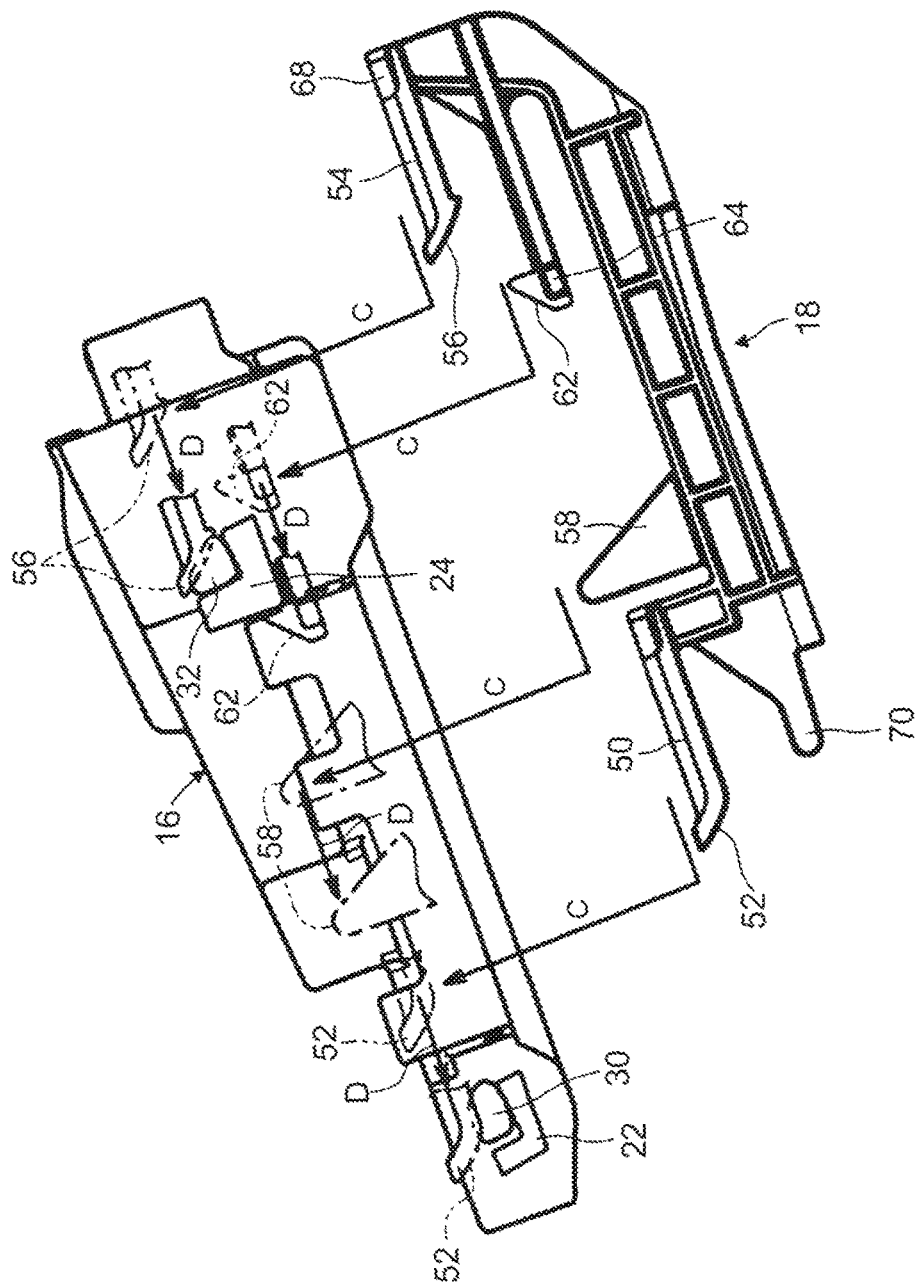
FIG. 10 is an explanatory view in which a process of assembling the second bracket with the first bracket and the in-vehicle camera is seen from a horizontal direction of a vehicle.
Figure 11:
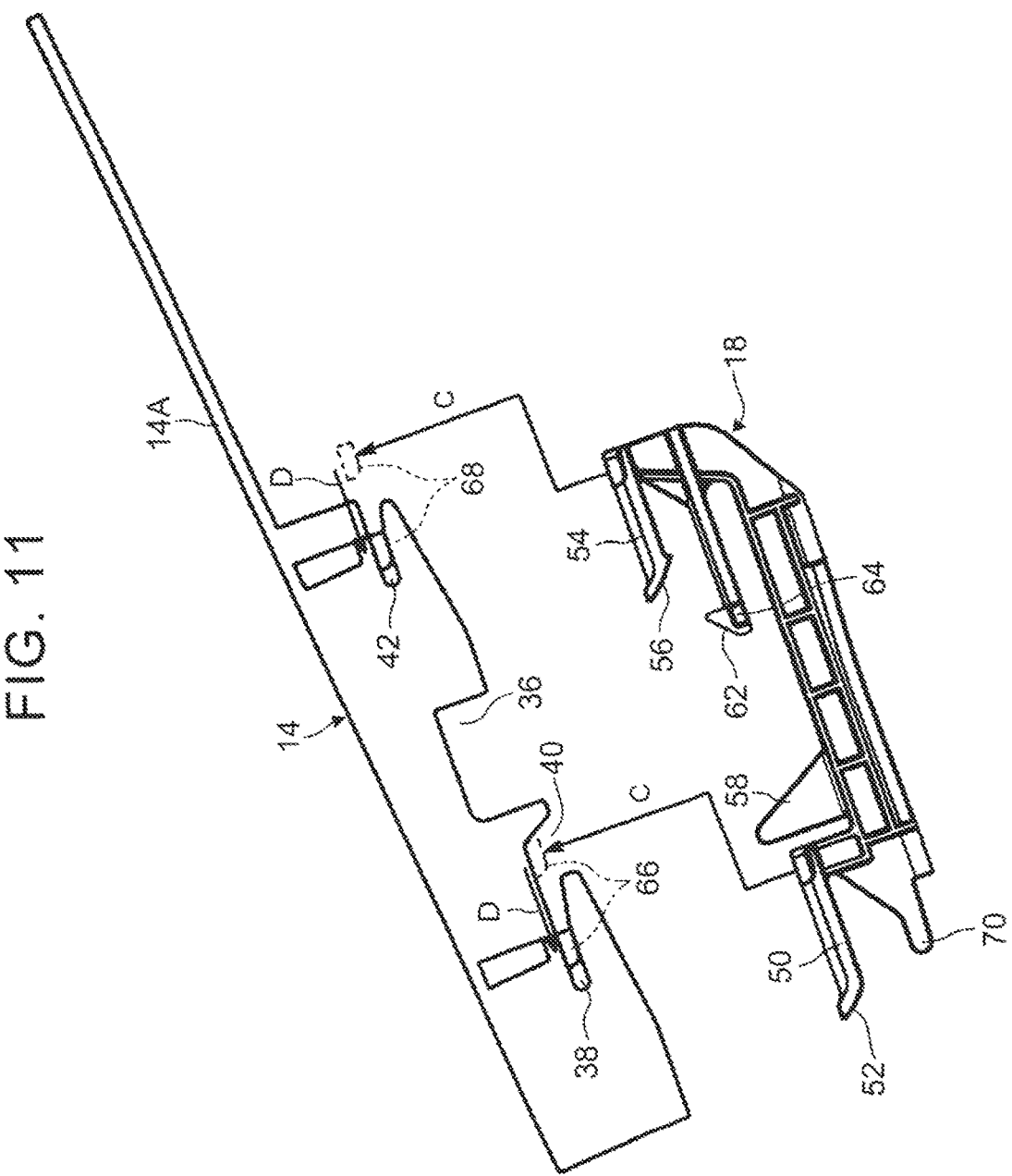
FIG. 11 is an explanatory view of a situation where a first guide projection and a second guide projection respectively move along a first guide groove and a second guide groove in the process of assembling the second bracket.

Next, as shown in FIG. 1, FIG. 10, and FIG. 11, the second bracket 18 moves upward from below with respect to the first bracket 14 and the in-vehicle camera 16. Then, the right and left first guide projections 66 are positioned in the corresponding guide receiving depressions 40, and each of the right and left second guide projections 68 is positioned on a rear side of the opening at the rear end of the corresponding guide groove 42. The first bracket 14 is not pressed against the windshield 12 by the second bracket 18 during this positioning. Next, the second bracket 18 moves to the front. In this case, each of the first guide projections 66 moves along the first guide groove 38, and the second guide projection 68 moves along the second guide groove 42. Accordingly, the second bracket 18 moves in the first direction that is indicated by an arrow D in FIG. 1, FIG. 10, and FIG. 11.

Figure 12:
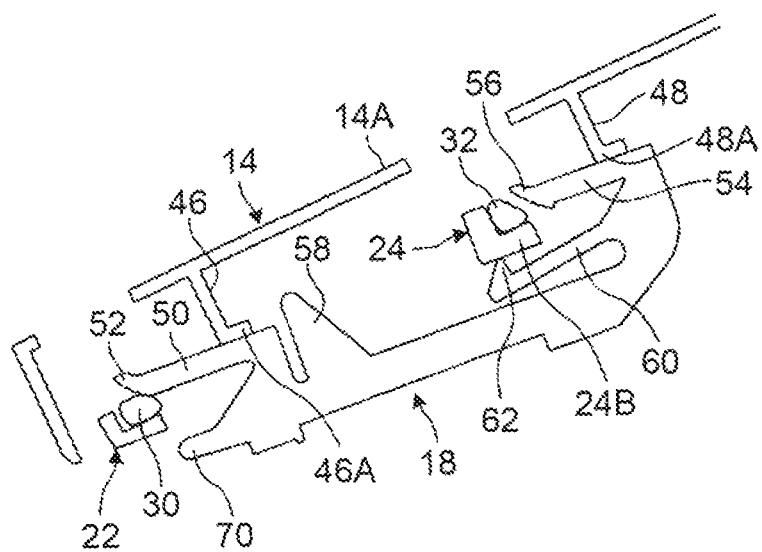
FIG. 12 is an explanatory view in which an initial stage of a process of moving the second bracket in a first direction with respect to the first bracket and the in-vehicle camera is seen from the horizontal direction of the vehicle.
Figure 13:
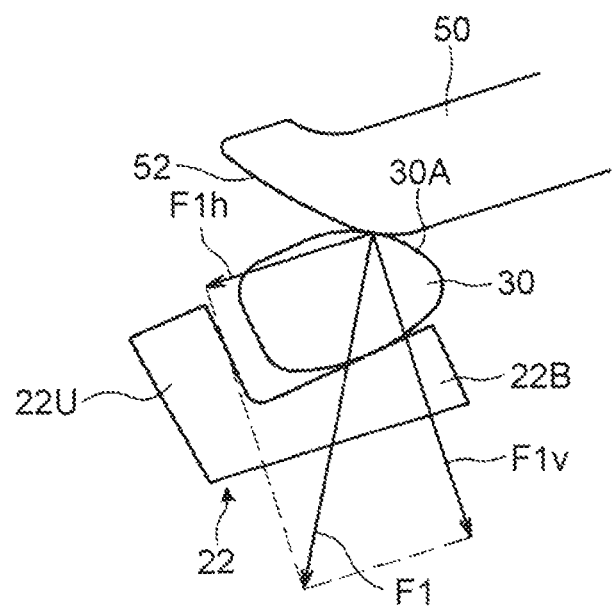
FIG. 13 is an explanatory view of a pressing force of a first pressing portion for pressing the first pressed portion against the first support portion at an initial stage shown in FIG. 12.

As shown in FIG. 12, at an initial stage of this movement in the first direction, each of the first pressing portions 52 partially rides on the corresponding first pressed portion 30, and each of the first elastic arms 50 is elastically curved and deformed upward. Accordingly, as shown in FIG. 13, each of the first pressed portions 30 is pressed against the first support portion 22 by the first pressing portion 52 with a pressing force F1 that has a component F1$h$ in the first direction and a downward component F1$v$ that is perpendicular to the component F1$h$. On the other hand, each of the second pressing portions 56 is maintained in a state of being spaced from the second pressed portion 32. In this way, the second pressing portion 56 does not press the second pressed portion 32.

In addition, at the initial stage of the movement in the first direction, an upper end of each one-way claw 62 is engaged with a lower surface of the bottom wall 24B of the corresponding second support portion 24. In this way, each of the third elastic arms 60 is elastically curved and deformed downward. Furthermore, the upper surface of each of the right and left first elastic arms 50 comes in contact with the first contact portion 46A at a tip of the corresponding first rib 46, and the upper surface of each of the right and left second elastic arms 54 comes in contact with the first contact portion 48A at a tip of the corresponding second rib 48.

Figure 14:
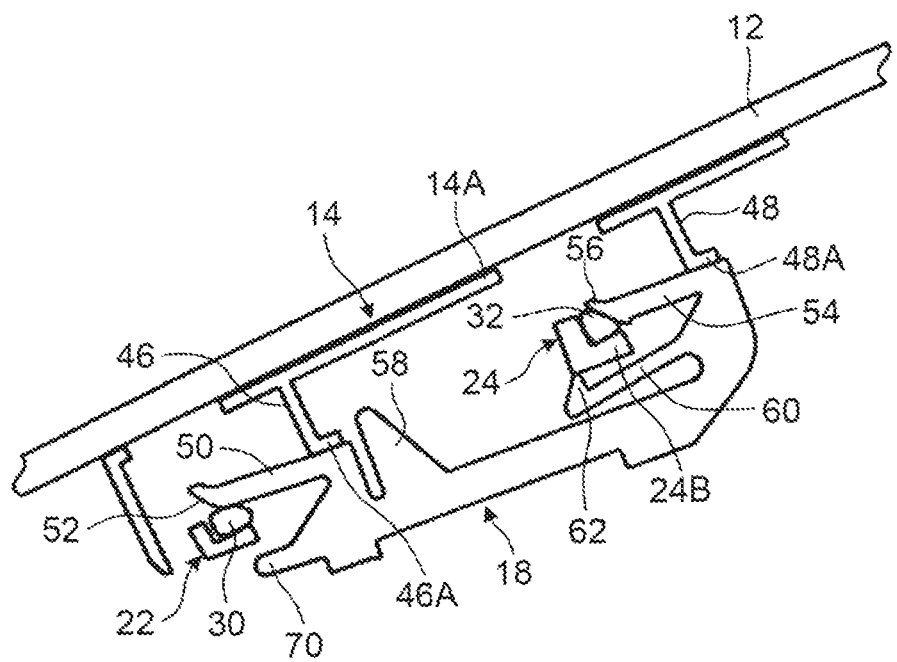
FIG. 14 is an explanatory view in which an intermediate stage of the process of moving the second bracket in the first direction with respect to the first bracket and the in-vehicle camera is seen from the horizontal direction of the vehicle.
Figure 15:
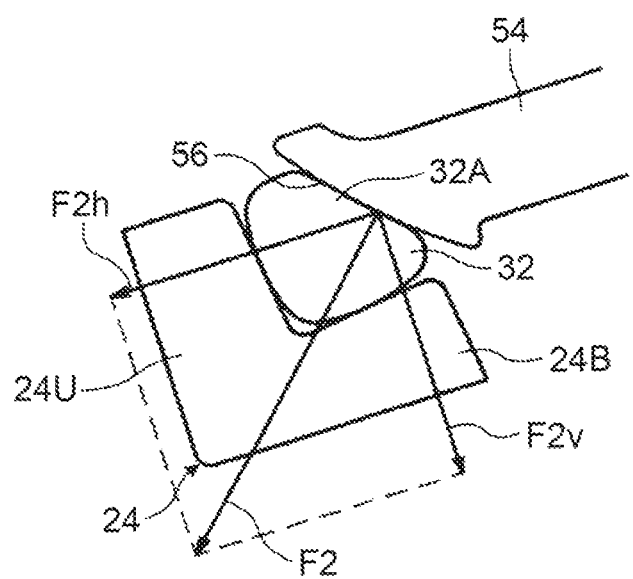
FIG. 15 is an explanatory view of a pressing force of a second pressing portion for pressing the second pressed portion against the second support portion at the intermediate stage shown in FIG. 14.

At an intermediate stage of the movement in the first direction, as shown in FIG. 14, each first pressing portion 52 further rides on the corresponding first pressed portion 30, and each second pressing portion 56 presses the second pressed portion 32 against the second support portion 24. Accordingly, each of the second elastic arms 54 is also elastically curved and deformed upward. As shown in FIG. 15, each of the second pressed portions 32 is pressed against the second support portion 24 by the second pressing portion 56 with a pressing force F2 that has a component F2$h$ in the first direction and a downward component F2$v$ that is perpendicular to the component F2$h$. In addition, while the upper end of each one-way claw 62 moves to the vicinity of a front end of the lower surface of the bottom wall 24B of the corresponding second support portion 24, each of the third elastic arms 60 maintains a state of being elastically curved and deformed downward.

Figure 16:
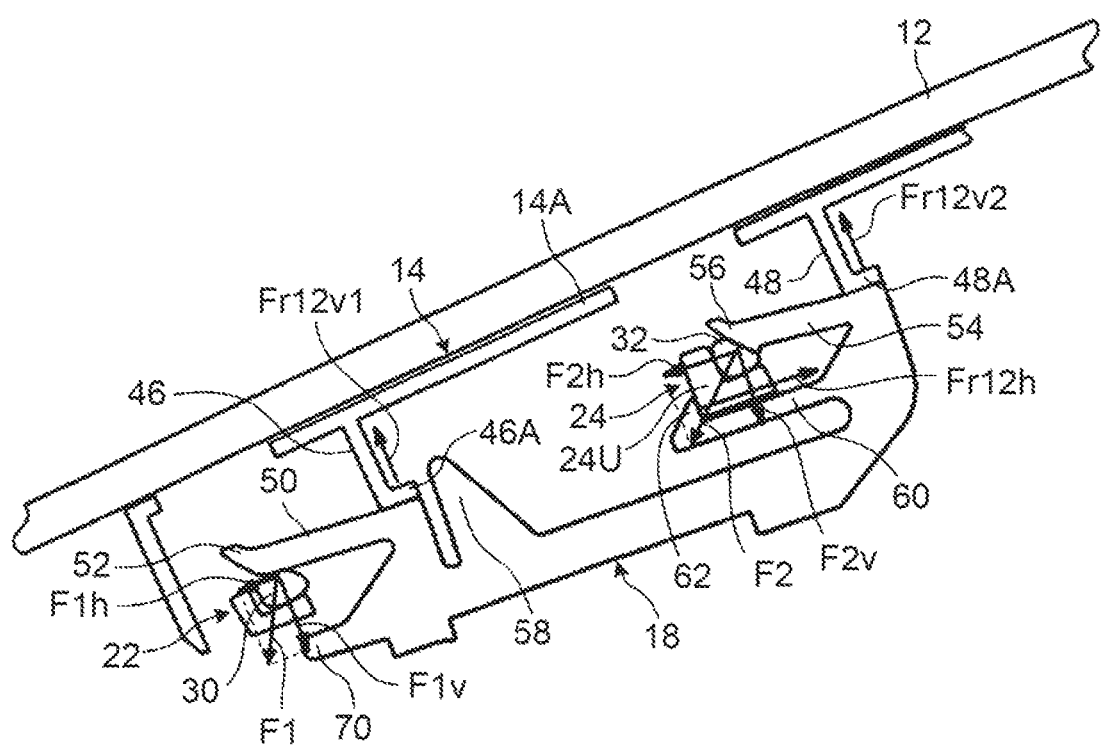
FIG. 16 is an explanatory view in which a final stage of the process of moving the second bracket in the first direction with respect to the first bracket and the in-vehicle camera is seen from the horizontal direction of the vehicle.

At a final stage of the movement in the first direction, as shown in FIG. 16, each of the first pressing portions 52 further rides on the corresponding first pressed portion 30, and each of the second pressing portions 56 further intensively presses the second pressed portion 32 against the second support portion 24. In addition, since the upper end of each one-way claw 62 moves beyond the front end of the lower surface of the bottom wall 24B of the corresponding second support portion 24, the one-way engagement surface 62A of each one-way claw 62 is engaged with a front surface of the upright portion 24U of the second support portion 24 in a one-way manner, and elastic deformation of each of the third elastic arms 60 is canceled. At this final stage, each second pressed portion 32 is held between the second pressing portion 56 and each of the bottom wall 24B and the upright portion 24U of the corresponding second support portion 24. A position of the second bracket 18 with respect to the first bracket 14 shown in FIG. 16 is the "attachment position".

Once the second bracket 18 is positioned at the attachment position, the right and left first pressed portions 30 and the right and left second pressed portions 32 are respectively positioned and held at specified positions with respect to the first support portions 22 and the second support portions 24 by the first pressing portions 52 and the second pressing portions 56. In this way, the in-vehicle camera 16 is positioned and held at a specified attachment position with respect to the first bracket 14. In this case, the upright portion 24U of each second support portion 24 and the one-way claw 62 respectively serve as the first one-way engagement portion and the second one-way engagement portion, and cooperate with each other to inhibit displacement of the second bracket 18 with respect to the first bracket 14 in a direction reverse to the first direction.

In a situation where the second bracket 18 is positioned at the attachment position, the first pressing portion 52 and the second pressing portion 56 respectively press the first pressed portion 30 and the second pressed portion 32 against the first support portion 22 and the second support portion 24 by using the pressing forces F1 and F2. Reaction forces of the component F1$h$ in the first direction of the pressing force F1 and the component F2$h$ in the first direction of the pressing force F2 (a sum of these reaction forces is referred to as a "reaction force Fr12$h$") respectively act on the first pressing portion 52 and the second pressing portion 56 from the first pressed portion 30 and the second pressed portion 32 in a direction opposite to the first direction. When the sum of the reaction force of the component F$h$ and the reaction force of the component F2$h$ is set as the "reaction force Fr12$h$", a main component of the reaction force Fr12$h$ is transmitted from each one-way claw 62 to the upright portion 24U of the second support portion 24. A remaining component of the reaction force Fr12*h* is transmitted to the corresponding first rib 46 and the corresponding second rib 48 as a friction force between the upper surface of each of the first elastic arms 50 and the first contact portion 46A and a friction force between the upper surface of each of the second elastic arms 54 and the first contact portion 48A.

In addition, reaction forces of the component F1*v* of the pressing force F1 that is perpendicular to the first direction and the component F2*v* of the pressing force F2 that is perpendicular to the first direction (a sum of these reaction forces is referred to as a "reaction force Fr12*v*") respectively acts on the first pressing portion 52 and the second pressing portion 56 from the first pressed portion 30 and the second pressed portion 32 in a direction that is upward and perpendicular to the first direction. When the sum of the reaction force of the component F1*v* and the reaction force of the component F2*v* is set as the "reaction force Fr12*v*", a portion Fr12*v*1 of the reaction force Fr12*v* is transmitted from the root of each first elastic arm 50 to the first contact portion 46A. A remaining portion Fr12V2 of the reaction force Fr12*v* is transmitted from the root of each second elastic arm 54 to the first contact portion 48A.

Accordingly, the root of the first elastic arm 50, the root of the second elastic arm 54, and the one-way claw 62 each serve as the first reaction force transmission portion, and the first pressing portion 52, the second pressing portion 56, and the upright portion 24U of the second support portion 24 each serve as the second reaction force transmission portion. In other words, each of the reaction forces that is generated when the first pressing portion 52 and the second pressing portion 56 respectively press the first pressed portion 30 and the second pressed portion 32 is transmitted from the second reaction force transmission portion to the first reaction force transmission portion, and thus is transmitted from the second bracket 18 to the first bracket 14.

Figure 17:
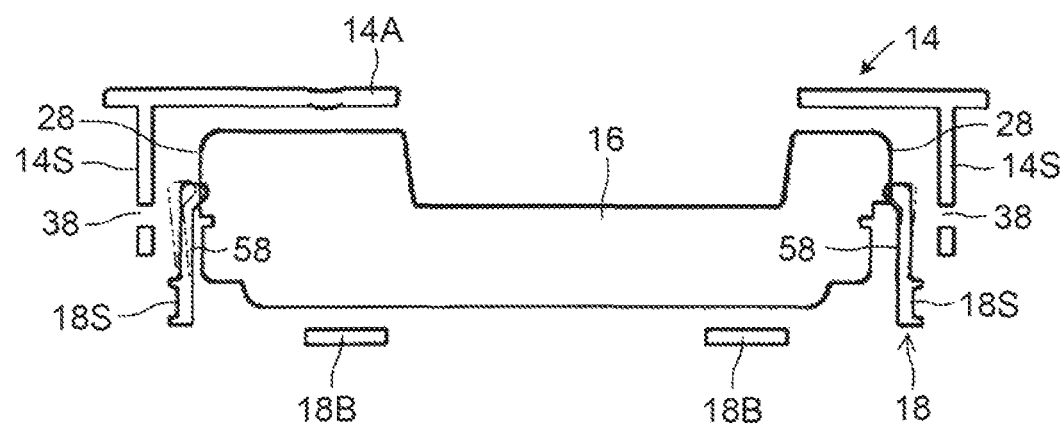
FIG. 17 is a transverse cross-sectional view of a region where a camera engagement portion is provided regarding a relationship among the first bracket, the in-vehicle camera, and the second bracket at the final stage shown in FIG. 16.

In addition, once the second bracket 18 is positioned at the attachment position, as indicated by virtual lines in FIG. 17, the right and left camera engagement projections 58 are engaged with the corresponding lateral surfaces 28 of the in-vehicle camera 16. Noted that the other portion of the lateral wall 18S of the second bracket 18 comes in contact with the lateral wall 14S of the first bracket 14. In this way, the in-vehicle camera 16 is also positioned by the second bracket 18 at the specified position with respect to the first bracket 14 in the horizontal direction of the vehicle. In addition, the first bracket 14 and the second bracket 18 are engaged with each other at portions other than both of the right and left lateral walls 14S and 18S. In this way, horizontal movement of the in-vehicle camera 16 relative to the first bracket 14 and the second bracket 18 is effectively inhibited.

Figure 18:
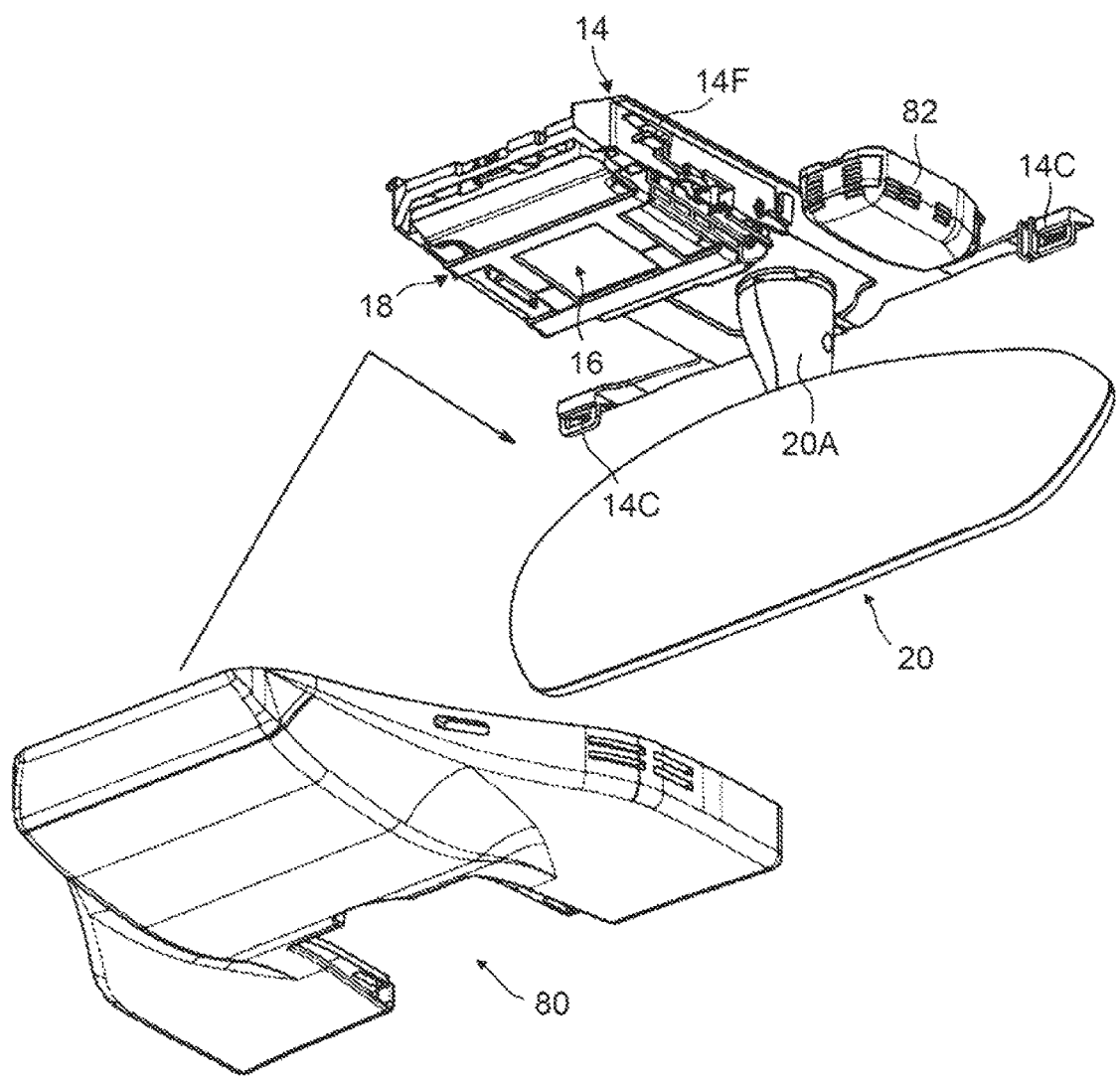
FIG. 18 is a perspective view of a procedure of attaching a cover to the first bracket so as to cover the in-vehicle camera and the second bracket.

Once the second bracket 18 is positioned at the attachment position, as shown in FIG. 18, the cover 80 moves upward from below with respect to the first bracket 14 and the like, and then moves to the rear. Then, an unillustrated engagement portion that is provided at each of two rear ends of the cover 80 is engaged with the attachment 14C of the first bracket 14. Furthermore, an unillustrated engagement portion that is provided at a front end of the cover 80 is engaged with an attachment 14F that is provided in a front end portion of the first bracket 14. In this way, the cover 80 is attached to the first bracket 14 in a manner to cover the in-vehicle camera 16 and the second bracket 18. Noted that a reference numeral 82 denotes a humidity sensor or a raindrop sensor in FIG. 18, and any of these sensors is covered with the cover 80 in the illustrated embodiment.

When the in-vehicle camera 16 is maintained or replaced, or when the second bracket 18 is replaced due to reduction in the pressing force that is generated by the second bracket 18 or the like, the cover 80 and the second bracket 18 are removed.

First, the engagement portion provided at the front end of the cover 80 is removed from the attachment 14F provided in the front end portion of the first bracket 14, and a front portion of the cover 80 is pulled down. Furthermore, the engagement portions provided at the two rear ends of the cover 80 are removed from the attachments 14C of the first bracket 14, and the cover 80 is thereby removed.

Next, the projections 64 for removal that are provided on the outer lateral surfaces of the right and left one-way claws 62 of the second bracket 18 are simultaneously pushed down. In this way, the one-way engagement between the one-way engagement surface 62A of each one-way claw 62 and the front surface of the upright portion 24U of each second support portion 24 is canceled. Once the one-way engagement is canceled, the second bracket 18 moves in the direction reverse to the first direction with respect to the first bracket 14 and the in-vehicle camera 16 due to the reaction forces that are generated by respective pressing of the first pressed portion 30 and the second pressed portion 32 by the first pressing portion 52 and the second pressing portion 56. Thus, the second bracket 18 is removed from the first bracket 14.

Noted that, when the reduction in the pressing force generated by the second bracket 18 or the like occurs, the second bracket 18 is replaced. In addition, when the in-vehicle camera 16 is maintained or replaced, the in-vehicle camera 16 moves in the direction reverse to the first direction with respect to the first bracket 14, and is removed from the first bracket 14. Then, a new in-vehicle camera 16 is attached by the first bracket 14 and the second bracket 18 following the above procedure.

As it is understood from the above description, following advantages can be achieved by the attachment structure 10 according to the embodiment.

Due to cooperation of the first bracket 14 and the second bracket 18 that is assembled thereto, the in-vehicle camera 16 can accurately be positioned at the specified position with respect to the first bracket 14, and thus the in-vehicle camera 16 can favorably be held at the specified position.

The first bracket 14 is not provided with a spring mechanism, and the pressing force for positioning and holding the in-vehicle camera 16 is generated by the elastic deformation of the second bracket 18. Thus, even when the maintenance is required, for example, for handling the reduction in the pressing force, or for the replacement of the in-vehicle camera 16 with one that requires changing of the pressing force, only the second bracket 18 needs to be replaced, and neither the first bracket 14 nor the windshield 12 needs to be replaced. Therefore, the maintenance related to the pressing force and/or the replacement of the in-vehicle camera 16 can easily and efficiently be performed at low cost.

When the second bracket 18 is assembled to the first bracket 14, the first pressing portion 52 and the second pressing portion 56 respectively press the first pressed portion 30 and the second pressed portion 32 against the first support portion 22 and the second support portion 24. However, the component of each of these pressing forces that is perpendicular to the first direction is directed downward to be spaced from the windshield 12. Thus, a force that includes an upward component does not act on the windshield 12. Therefore, even in the case where the in-vehicle camera 16 is attached after the windshield 12, to which the first bracket 14 is fixed in advance, is adhered to a vehicle body, the windshield 12 is not removed from the vehicle body due to the assembly of the second bracket 18.

The first support portions 22 are spaced from each other in the horizontal direction of the vehicle. In addition, each of the pair of the second support portions 24, the pair of the first pressed portions 30, the pair of the second pressed portions 32, the pair of the first pressing portions 52, and the pair of the second pressing portion 56 is provided in the same manner as the pair of the first support portions 22. Therefore, compared to a case where only one member is provided for each of the these portions, the in-vehicle camera 16 can accurately be positioned at the specified position with respect to the first bracket 14, and thus the in-vehicle camera 16 can favorably be held at the specified position.

The pressing forces for respectively pressing the first pressed portion 30 and the second pressed portion 32 by the first pressing portion 52 and the second pressing portion 56 are generated by the elastic deformation of the first elastic arm 50 and the second elastic arm 54. Therefore, compared to a structure for generating the pressing force by a spring member that is fixed to the second bracket 18, it is possible to reduce the number of components and thus to reduce the cost.

While and after the second bracket 18 is assembled to the first bracket 14, the in-vehicle camera 16 is supported by the right and left first support portions 22 and the right and left second support portion 24, and the weight of the in-vehicle camera 16 is borne by the first support portion 22 and the second support portion 24. Thus, when assembling the second bracket 18, the worker does not need to hold the in-vehicle camera 16, and thus tasks can efficiently be performed. In addition, since the second bracket 18 does not need to bear the weight of the in-vehicle camera 16, strength and rigidity that are requested for the second bracket 18 can be alleviated.

As shown in FIG. 17, when the second bracket 18 is at the attachment position, each of the lateral walls 18S of the second bracket 18 is located between the in-vehicle camera 16 and the corresponding one of the lateral walls 14S of the first bracket 14 and between the lateral walls 14S. Then, the in-vehicle camera 16 is held between the lateral walls 18S by the pair of the camera engagement projections 58. In this way, the in-vehicle camera 16 is restrained in the horizontal direction. Therefore, compared to a structure in which each lateral wall 18S of the second bracket 18 is located outside of the pair of the lateral walls 14S of the first bracket 14 and in which the in-vehicle camera 16 is held via the lateral walls 14S, the strength and the rigidity that are requested for the second bracket 18 can be alleviated.

When the second bracket 18 is positioned at the attachment position, the one-way claw 62 is engaged with the upright portion 24U of the second support portion 24. Thus, the displacement of the second bracket 18 with respect to the first bracket 14 in the direction reverse to the first direction is inhibited. Thus, the second support portion 24 has a function as the first one-way engagement portion in addition to a function as the support portion. Therefore, compared to a case where the first one-way engagement portion is provided in a portion other than the support portion, a structure of the first bracket 14 can be simplified. In addition, the reaction force that is in the direction reverse to the first direction and is generated due to a pressing force by the second pressing portion 56 can effectively be transmitted to the first bracket 14.

Figure 19:
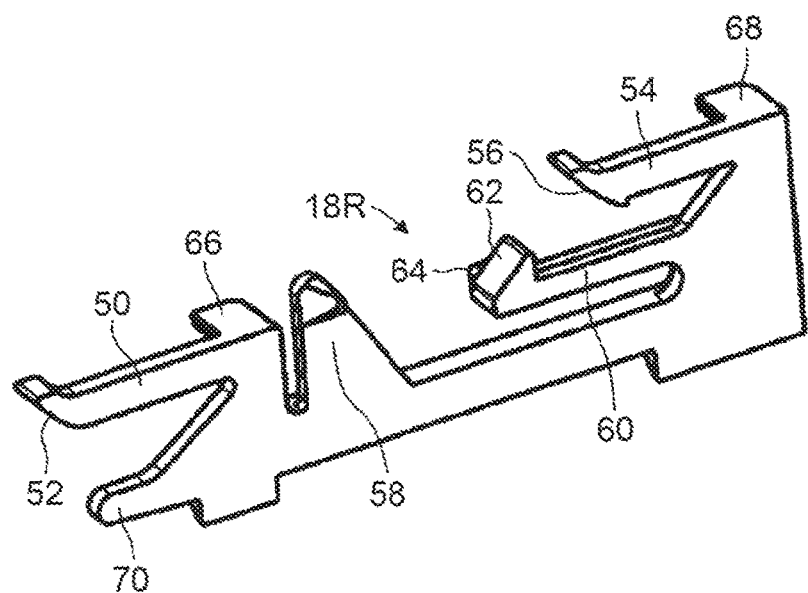
FIG. 19 is a perspective view of a right sub-bracket according to a first modified example of the attachment structure for an in-vehicle camera according to the embodiment of the invention when seen obliquely from the front and above.

FIG. 19 is a perspective view of a right sub-bracket 18R according to a first modified example of the in-vehicle-camera attachment structure according to the invention when seen obliquely from the front and above. The right sub-bracket 18R can be regarded as the second bracket.

In the first modified example, the second bracket is constructed of two sub-brackets that correspond to the pair of the lateral walls 18S of the second bracket 18 in the above-described embodiment. As shown in FIG. 19, the right sub-bracket 18R is configured in a similar manner as the right lateral wall 18S of the embodiment. In addition, a left sub-bracket (18L), which is not shown in FIG. 19, is configured in a similar manner as the left lateral wall 18S of the embodiment.

As for the attachment of the in-vehicle camera 16, similar to the embodiment, the in-vehicle camera 16 is arranged first. Next, similar to the case of the attachment of the second bracket 18 in the embodiment, the sub-brackets 18R and 18L are assembled to the first bracket 14 either simultaneously or sequentially.

In addition, as for the maintenance and the like of the in-vehicle camera 16, the projections 64 for removal that are provided on the outer lateral surfaces of the right and left one-way claws 62 are pushed down either simultaneously or sequentially. In this way, the one-way engagement between each one-way claw 62 and the front surface of the upright portion 24U of the second support portion 24 is canceled. Then, the sub-brackets 18R and 18L are removed from the first bracket 14 either simultaneously or sequentially.

According to the first modified example, the similar advantages as those in the above-described embodiment can be obtained, and the bottom wall 18B in the above-described embodiment is unnecessary. Therefore, compared to the case in the above-described embodiment, the cost can be reduced, and the weight can also be reduced.

Figure 20:
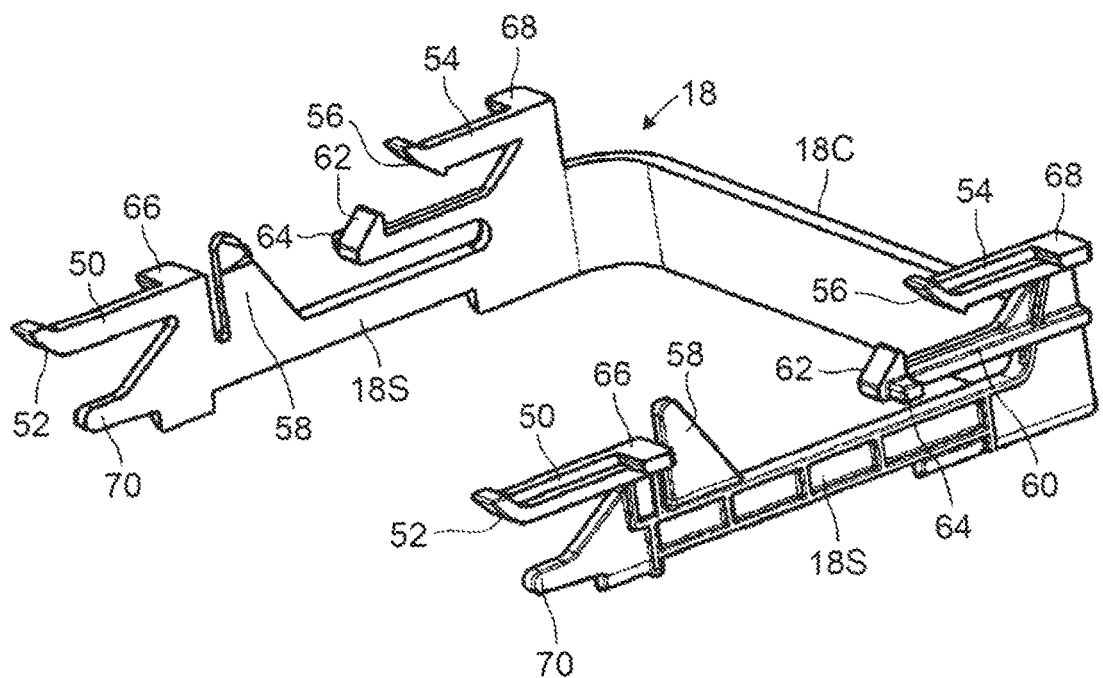
FIG. 20 is a perspective view of the second bracket according to a second modified example of the attachment structure for an in-vehicle camera according to the invention when seen obliquely from the front and above.

FIG. 20 is a perspective view of the second bracket 18 according to a second modified example of the in-vehicle-camera attachment structure according to the invention when seen obliquely from the front and above.

In the second modified example, the rear ends of the paired lateral walls 18S of the second bracket 18 in the above-described embodiment are integrally connected not by the bottom wall 18B but by a back wall 18C. The rest of the second modified example is the same as the above-described embodiment.

As for the attachment of the in-vehicle camera 16, similar to the attachment of the second bracket 18 in the embodiment, the second bracket 18 is assembled to the first bracket 14. In addition, as for the maintenance and the like of the in-vehicle camera 16, by following the same procedure as that in the embodiment, the one-way engagement between each one-way claw 62 and the front surface of the second support portion 24 is canceled, and then the second bracket 18 is removed from the first bracket 14.

Figure 21:
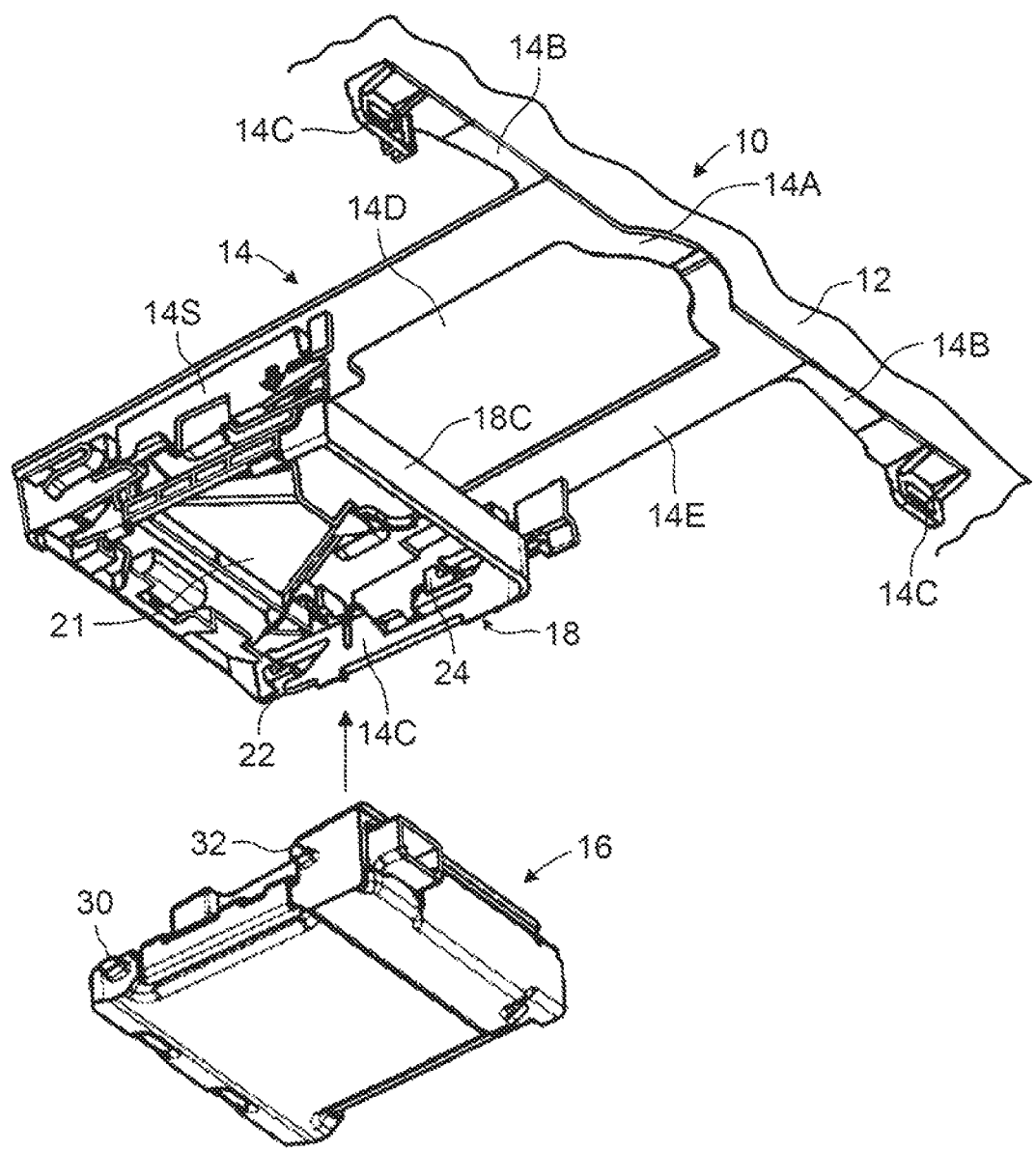
FIG. 21 is an explanatory view of a procedure in the second modified example in which the second bracket is temporarily attached to the first bracket and the in-vehicle camera is attached thereafter.

In addition, in this second modified example, as shown in FIG. 21, first, the second bracket 18 may temporarily be attached to the first bracket 14 so as to prevent dropping of the second bracket 18. Then, the in-vehicle camera 16 is arranged at the specified position on the inner side of the second bracket 18 from below. Thereafter, the second bracket 18 may be moved to the first direction.

According to the second modified example, the advantages similar to those in the above-described embodiment can be obtained, and there are slight restrictions on a thickness of the in-vehicle camera 16 and a shape of the lower surface. Therefore, the maintenance, replacement, and the like of the in-vehicle camera 16 can be performed without removing the second bracket 18 from the first bracket 14.

Figure 22:
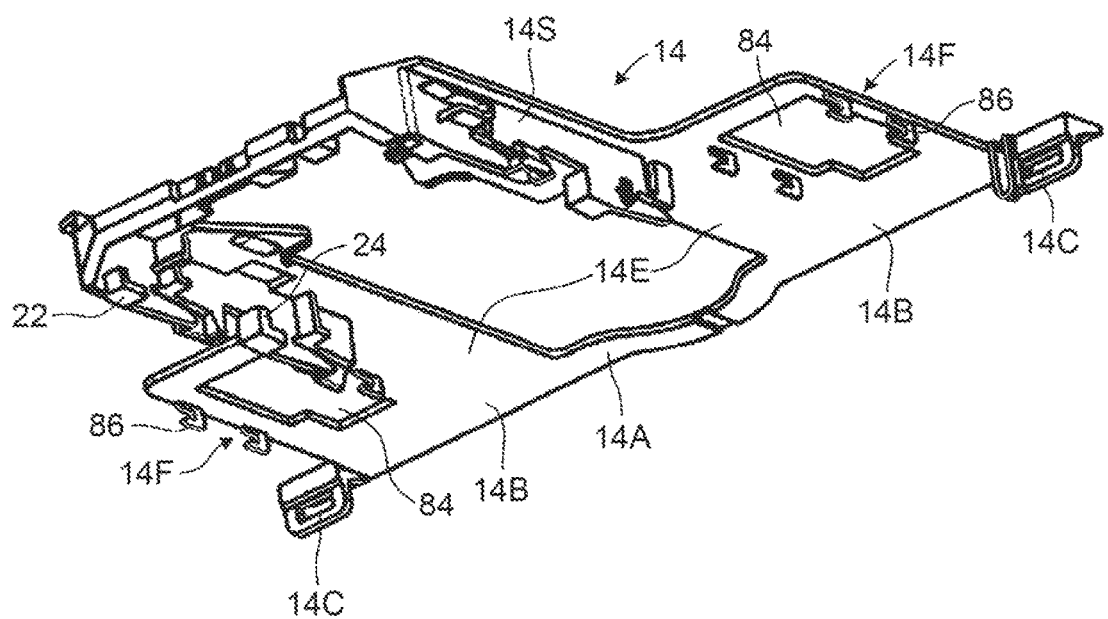
FIG. 22 is a perspective view of the first bracket according to a third modified example of the attachment structure for an in-vehicle camera according to the invention when seen obliquely from the front and below.

FIG. 22 is a perspective view of the first bracket 14 according to a third modified example of the in-vehicle-camera attachment structure according to the invention when seen obliquely from the front and below.

In the third modified example, the base 14A of the first bracket 14 is provided with a sensor attachment 14G that is integrated with each arm 14B and the right and left lateral sides 14E. The sensor attachment 14G has a punched portion 84 formed in the base 14A, and four hooks 86 that are formed around the punched portion 84 in an integrated manner with the base 14A. Although not shown in FIG. 22, a sensor such as a humidity sensor and a raindrop sensor is attached to the sensor attachment 14G in a state partially fitted to the punched portion 84 by the hooks 86.

According to the third modified example, compared to the case where the sensor is attached to the arm 14B and the lateral side 14E, accuracy of attachment of the sensor to the base 14A of the first bracket 14 can be improved.

Noted that, in the third modified example, the second bracket 18 is not restricted by a difference in the structure of the first bracket 14. Therefore, the second bracket 18 may be any of the second brackets in the above-described embodiment, the first modified example, and the second modified example.

Figure 23:
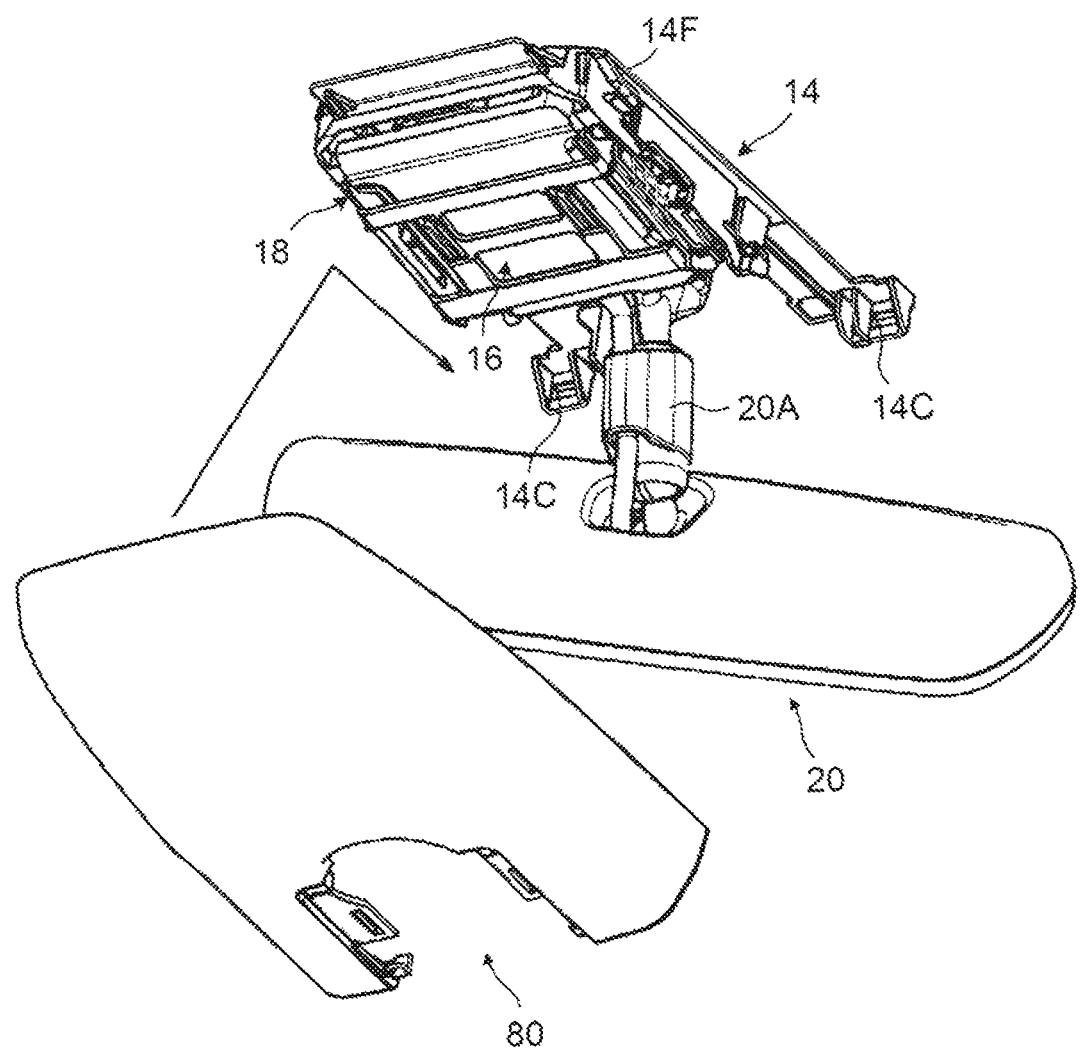
FIG. 23 is a perspective view of a procedure in a fourth modified example of the attachment structure for an in-vehicle camera according to the invention in which the cover is attached to the first bracket so as to cover the in-vehicle camera and the second bracket.

FIG. 23 is a perspective view of a procedure in a fourth modified example of the in-vehicle-camera attachment structure according to the invention in which the cover 80 is attached to the first bracket 14 so as to cover the in-vehicle camera 16 and the second bracket 18.

In the fourth modified example, the sensor that corresponds to the humidity sensor or the raindrop sensor 82 in the above-described embodiment is not attached to the first bracket 14. Accordingly, the first bracket 14 does not have a portion corresponding to the arm 14B in the above-described embodiment, and the cover 80 does not have a portion for accommodating the humidity sensor or the raindrop sensor 82.

The detailed description has been made so far on the invention regarding the particular embodiment. However, the invention is not limited to the above-described embodiment.

For example, in the above-described embodiment, the first pressing portion 52 and the second pressing portion 56 respectively press the first pressed portion 30 and the second pressed portion 32 against the first support portion 22 and the second support portion 24. However, pressing of the first pressed portion 30 against the first support portion 22 by the first pressing portion 52 may be omitted. In such a case, it is preferred that the second bracket 18 positions the in-vehicle camera 16 at the specified position with respect to the first bracket 14 by using a portion other than the second pressed portion 32.

In addition, in the above-described embodiment, the reaction forces that are generated when the first pressing portion 52 and the second pressing portion 56 respectively press the first pressed portion 30 and the second pressed portion 32 in a direction crossing the windshield 12 are mainly transmitted from the first elastic arm 50 and the second elastic arm 54 to the first contact portions 46A and 48A. However, the embodiment may be modified such that at least part of this reaction force is transmitted from the one-way claw 62 to the second support portion 24.

In addition, in the above-described embodiment, the pressing forces of the first pressing portion 52 and the second pressing portion 56 for respectively pressing the first pressed portion 30 and the second pressed portion 32 are generated due to the elastic deformation of the first elastic arm 50 and the second elastic arm 54. However, the embodiment may be modified such that the pressing forces are generated by spring members fixed to the second bracket 18.

In addition, in the above-described embodiment, the first support portions 22 are spaced from each other in the horizontal direction of the vehicle. In addition, each of the pair of the second support portions 24, the pair of the first pressed portions 30, the pair of the second pressed portions 32, the pair of the first pressing portions 52, and the pair of the second pressing portions 56 is provided in the same manner as the pair of the first support portions 22. However, the total number of members may be three, two, or one for each of the support portions, the pressed portion, and the pressing portion.

In addition, in the above-described embodiment, the upright portion 24U of the second support portion 24, which is the first one-way engagement portion, is located between the first support portion 22 and the second support portion 24 when seen in the first direction. However, one of the first support portion 22 and the second support portion 24 may be located between the first one-way engagement portion and the other of the first support portion 22 and the second support portion 24.

In addition, in the above-described embodiment, each of the first pressed portions 30 comes in contact with the corresponding one of first support portions 22 when the in-vehicle camera 16 is temporarily placed on the right and left first support portions 22 and the right and left first second support portions 24. However, when the in-vehicle camera 16 is temporarily placed, one of the paired first pressed portions 30 may be floated from the corresponding first support portion 22 and thus may not come in contact therewith. In such a case, compared to the embodiment, the required accuracy of the position of each of the first pressed portion 30 and the second pressed portion 32 with respect to the corresponding one of the first support portion 22 the second support portion 24 can be alleviated.

In addition, in the above-described embodiment, the first direction is a direction that conforms to the front direction of the vehicle and is substantially along the windshield 12. However, the first direction may be a direction other than the direction that conforms to the front direction of the vehicle.

In addition, in the above-described embodiment, when the second bracket 18 is at the attachment position, each lateral wall 18S of the second bracket 18 is located between the in-vehicle camera 16 and the lateral wall 14S on the inner side of the paired lateral walls 14S of the first bracket 14. However, the embodiment may be modified such that each lateral wall 18S of the second bracket 18 is located on the outer side of the paired lateral walls 14S of the first bracket 14.

In addition, in the above-described embodiment, the first pressed portion 30 and the second pressed portion 32 are formed in the housing 25 of the in-vehicle camera 16. However, the in-vehicle camera 16 may be formed of a camera body and a casing for detachably accommodating the camera body, and the pressed portions may be provided in the casing instead of the camera body.

Furthermore, in the above-described embodiment, the first support portion 22 and the second support portion 24 are respectively positioned below the first pressed portion 30 and the second pressed portion 32 of the in-vehicle camera 16. However, the embodiment may be modified such that the first support portion 22 and the second support portion 24 are respectively positioned above the first pressed portion 30 and the second pressed portion 32 of the in-vehicle camera 16.

What is claimed is:

1. An attachment structure for an in-vehicle camera, the attachment structure being configured to attach an in-vehicle camera to an inner surface of a windshield of a vehicle, the attachment structure comprising:
a first bracket fixed to the inner surface of the windshield; and
a second bracket configured to hold an in-vehicle camera with respect to the first bracket when the second bracket is attached to the first bracket at an attachment position, wherein
the first bracket includes a support portion and a first one-way engagement portion, the second bracket includes a pressing portion and a second one-way engagement portion,
the pressing portion has elasticity,
the pressing portion is configured to press a pressed portion of the in-vehicle camera against the support portion and to hold the pressed portion between the pressing portion and the support portion when the second bracket is at the attachment position,
the second one-way engagement portion is configured to cooperate with the pressing portion to inhibit the second bracket from moving with respect to the first bracket when the second one-way engagement portion is engaged with the first one-way engagement portion,
the second bracket is attached to the first bracket when the second bracket is displaced with respect to the first bracket in a first direction substantially along the windshield,
the pressing portion is configured to press the pressed portion in a second direction crossing the first direction and the windshield when the second bracket is at the attachment position, the pressing portion contacting the pressed portion from a windshield side of the attachment structure,
the support portion is provided on a lateral surface of a lateral wall of the first bracket,
the pressing portion is provided on an arm extending in a direction along the windshield and is provided on a lateral wall of the second bracket, the arm including a second contact portion and a first bracket having a first contact portion at a lower side of the first bracket, and
the first contact portion contacts the second contact portion from the windshield side when the second bracket is at the attachment position.

2. The attachment structure according to claim 1, wherein
the support portion includes a portion positioned below the pressing portion when the second bracket is at the attachment position, and
the second direction is a direction away from the windshield downward.

3. The attachment structure according to claim 1, wherein
the first bracket includes the first contact portion, the first contact portion extending parallel to the first direction,
the second bracket includes the second contact portion, the second contact portion in contact with the first contact portion when the second bracket is at the attachment position,
at least part of a reaction force generated when the pressing portion presses the pressed portion in the first direction is transmitted from the second one-way engagement portion to the first one-way engagement portion, and
at least part of a reaction force generated when the pressing portion presses the pressed portion in the second direction is transmitted from the second contact portion to the first contact portion.

4. The attachment structure according to claim 2, wherein
the first bracket includes the first contact portion, the first contact portion extending parallel to the first direction,
the second bracket includes the second contact portion, the second contact portion in contact with the first contact portion when the second bracket is at the attachment position,
at least part of a reaction force generated when the pressing portion presses the pressed portion in the first direction is transmitted from the second one-way engagement portion to the first one-way engagement portion, and
at least part of a reaction force generated when the pressing portion presses the pressed portion in the second direction is transmitted from the second contact portion to the first contact portion.

5. The attachment structure according to claim 1, further comprising
the in-vehicle camera, wherein
the pressed portion includes a first pressed portion and a second pressed portion,
the first pressed portion and the second pressed portion are spaced from each other at least in the first direction when the in-vehicle camera is attached in the attachment structure,
the support portion includes a first support portion and a second support portion,
the pressing portion includes a first pressing portion and a second pressing portion,
the first pressing portion is configured to press the first pressed portion against the first support portion when the in-vehicle camera is attached in the attachment structure, and
the second pressing portion is configured to press the second pressed portion against the second support portion when the in-vehicle camera is attached in the attachment structure.

6. The attachment structure according to claim 5, wherein
the first pressed portion includes a pair of first pressed portions configured to extend along the windshield and to be spaced from each other in a direction perpendicular to the first direction when the second bracket is at the attachment position and the in-vehicle camera is attached in the attachment structure,
the second pressed portion includes a pair of second pressed portions configured to extend along the windshield and to be spaced from each other in the direction perpendicular to the first direction when the second bracket is at the attachment position and the in-vehicle camera is attached in the attachment structure,
the first support portion includes a pair of first support portions configured to extend along the windshield and to be spaced from each other in the direction perpendicular to the first direction when the second bracket is at the attachment position and the in-vehicle camera is attached in the attachment structure,
the second support portion includes a pair of second support portions configured to extend along the windshield and to be spaced from each other in the direction perpendicular to the first direction when the second bracket is at the attachment position and the in-vehicle camera is attached in the attachment structure,
the first pressing portion includes a pair of first pressing portions configured to extend along the windshield and to be spaced from each other in the direction perpendicular to the first direction when the second bracket is at the attachment position and the in-vehicle camera is attached in the attachment structure, and the second pressing portion includes a pair of second pressing portions configured to extend along the windshield and to be spaced from each other in the direction perpendicular to the first direction when the second bracket is at the attachment position and the in-vehicle camera is attached in the attachment structure.

7. The attachment structure according to claim 5, wherein
the second bracket is configured to be displaced in a third direction from the second support portion toward the first support when the second bracket is attached to the first bracket,
the first pressing portion is positioned on an advanced side with respect to the second pressing portion in the third direction,
the first pressing portion is configured to press, when the second bracket is attached to the first bracket, the first pressed portion against the first support portion before the second pressing portion presses the second pressed portion against the second support portion, and
the second pressing portion is configured to make a surface contact with the second pressed portion when the second bracket reaches the attachment position.

8. The attachment structure according to claim 6, wherein
the second bracket is configured to be displaced in a third direction from the second support portion toward the first support when the second bracket is attached to the first bracket,
the first pressing portion is positioned on an advanced side with respect to the second pressing portion in the third direction,
the first pressing portion is configured to press, when the second bracket is attached to the first bracket, the first pressed portion against the first support portion before the second pressing portion presses the second pressed portion against the second support portion, and
the second pressing portion is configured to make a surface contact with the second pressed portion when the second bracket reaches the attachment position.

9. The attachment structure according to claim 5, wherein
the first support portion includes a portion positioned below the first pressing portion when the second bracket is at the attachment position,
the second support portion includes a portion positioned below the second pressing portion when the second bracket is at the attachment position, and
the second direction is a direction away from the windshield downward.

10. The attachment structure according to claim 6, wherein
the first support portion includes a portion positioned below the first pressing portion when the second bracket is at the attachment position,
the second support portion includes a portion positioned below the second pressing portion when the second bracket is at the attachment position, and
the second direction is a direction away from the windshield downward.

11. The attachment structure according to claim 7, wherein
the first support portion includes a portion positioned below the first pressing portion when the second bracket is at the attachment position,
the second support portion includes a portion positioned below the second pressing portion when the second bracket is at the attachment position, and
the second direction is a direction away from the windshield downward.

12. The attachment structure according to claim 5, wherein
the first one-way engagement portion is positioned between the first support portion and the second support portion in the first direction.

13. The attachment structure according to claim 5, wherein
the first bracket includes a pair of first contact portions, the first contact portions extending parallel to the first direction and being spaced from each other in the first direction,
the second bracket includes a pair of second contact portions,
each of the second contact portions is configured to come in contact with a corresponding one of the first contact portions when the second bracket is at the attachment position,
at least part of a reaction force generated when the first pressing portion presses the first pressed portion in the first direction is transmitted from the second one-way engagement portion to the first one-way engagement portion,
at least part of a reaction force generated when the second pressing portion presses the second pressed portion in the first direction is transmitted from the second one-way engagement portion to the first one-way engagement portion,
at least part of a reaction force generated when the first pressing portion presses the first pressed portion in the second direction is transmitted from the second contact portions to the first contact portions and the first one-way engagement portion, and
at least part of a reaction force generated when the second pressing portion presses the second pressed portion in the second direction is transmitted from the second contact portions to the first contact portions and the first one-way engagement portion.

14. The attachment structure according to claim 1, wherein
the first bracket includes a first guide portion,
the second bracket includes a second guide portion, and
the first guide portion and the second guide portion are configured to cooperate with each other to guide the second bracket to move in the first direction.

15. The attachment structure according to claim 1, wherein
the second bracket includes a camera engagement portion, and
the camera engagement portion is configured to be engaged, when the second bracket is at the attachment position and the in-vehicle camera is attached in the attachment structure, with the in-vehicle camera to inhibit the in-vehicle camera from moving along the windshield perpendicularly to the first direction with respect to the first bracket and the second bracket.

16. The attachment structure according to claim 1, wherein
the first bracket includes a pair of first lateral walls,
the first lateral walls extend along the windshield in the first direction, and are spaced from each other perpendicularly to the first direction,
the second bracket includes a pair of second lateral walls, the second lateral walls extend along the windshield in the first direction and are spaced from each other perpendicularly to the first direction when the second bracket is at the attachment position, one of the pair of the first lateral walls and the pair of the second lateral walls is configured to directly hold at least a part of the in-vehicle camera, and at least a part of the first lateral wall is engaged, when the second bracket is at the attachment position, with the second lateral wall to inhibit the second bracket from moving with respect to the first bracket in a direction crossing the first lateral walls and the second lateral walls.

17. The attachment structure according to claim 1, wherein an inclination angle of the first direction with respect to the windshield is 20 degrees or less.

18. The attachment structure according to claim 1, wherein an inclination angle of the second direction with respect to the windshield is 70 degrees or more.

19. The attachment structure according to claim 1, wherein the second direction is perpendicular to the first direction.

* * * * *